US010460242B1

(12) United States Patent
Procter

(10) Patent No.: US 10,460,242 B1
(45) Date of Patent: Oct. 29, 2019

(54) SYSTEM AND METHOD FOR CLUSTERING INTEREST PATTERNS BASED ON A PLURALITY OF PRIORITY VALUES

(71) Applicant: FULCRUM MANAGEMENT SOLUTIONS LTD., Rossland (CA)

(72) Inventor: Thomas John Procter, New Westminster (CA)

(73) Assignee: Fulcrum Management Solutions, Ltd., Rossland, BC (CA)

( * ) Notice: Subject to any disclaimer, the term of this patent is extended or adjusted under 35 U.S.C. 154(b) by 0 days.

(21) Appl. No.: 16/001,375

(22) Filed: Jun. 6, 2018

(51) Int. Cl.
*G06N 5/02* (2006.01)
*G06F 16/28* (2019.01)

(52) U.S. Cl.
CPC .............. *G06N 5/02* (2013.01); *G06F 16/285* (2019.01)

(58) Field of Classification Search
CPC ................................. G06N 5/02; G06N 20/00
See application file for complete search history.

(56) References Cited

U.S. PATENT DOCUMENTS

| 2008/0103880 A1* | 5/2008 | Saaty | G06Q 30/02 |
| | | | 705/12 |
| 2017/0024395 A1* | 1/2017 | Michelson | H04L 65/403 |
| 2018/0225602 A1* | 8/2018 | Joi | G06Q 10/063 |

* cited by examiner

*Primary Examiner* — Eric Nilsson
(74) *Attorney, Agent, or Firm* — Marin Patents LP; Gustavo Marin

(57) ABSTRACT

A system and method for clustering interest for a plurality of participant devices based on open-ended, free-form communication between a plurality of user devices using priority value responses from the plurality of participant devices based on distributed thought objects associated to the open-ended, free-form communication. The system and method using a ratings matrix, comprising a plurality of priority values, that is permutated by assigning participant devices into interest clusters by first suing a strict association method and then increasing cohorts by using a tolerant association method.

16 Claims, 17 Drawing Sheets

SYSTEM AND METHOD FOR CLUSTERING INTEREST PATTERNS BASED ON A PLURALITY OF PRIORITY VALUES

CROSS-REFERENCE TO RELATED APPLICATIONS

None.

BACKGROUND OF THE INVENTION

Field of the Art

The disclosure relates to the field of processing qualitative responses from a plurality of user devices, and more particularly to the field of computing grouped interest analysis for a plurality of qualitative responses received from a plurality of user devices.

Discussion of the State of the Art

In systems where input from a plurality of user devices is solicited, understanding and grouping a large quantity of responses in terms of interests, is often inaccurate, if not impossible.

Typically, when results from a plurality of user participant devices are used to gather input on a subject, two different types of participant responses are elicited: quantitative responses and qualitative responses. A quantitative response is a close-ended response, such as a multiple choice, numeric style, or yes/no response. A qualitative response is an open-ended, comment style response, where the participant has freedom to textualize associated ideas and is not constrained by pre-determined answers. Accordingly, eliciting qualitative responses may have substantial benefits over quantitative responses in that qualitative responses can provide more detailed information on participant interests, consisting of areas of alignment, sentiment or topics, to name a few.

However, there are well known limitations with handling, evaluating, or otherwise processing qualitative responses, as compared to quantitative responses. This problem of processing qualitative responses generalizes to dealing with any amount of gathered textual or quantitative information that could be acquired by a survey or by other means (e.g., transcripts of phone conversations, transactions in a communication center environment, and the like). Specifically, there is no easy way to aggregate or summarize groups of likeminded, and in some respects incompatible, responses in a way to organize groups of interest clusters, associated to the qualitative textual response, received from the plurality of user participant devices.

Further according to the art, many online engagement and survey services offer methods of obtaining information about a group of participants; however, as the number of responses increases so does the amount of data and the complexity of extracting useful information from the results.

Accordingly, a need in the art exists for a system and method for computing a detailed analysis of patterns associated to a plurality of priority values from a plurality of user devices using free-form, open-ended communication comprising ways of identifying interest clusters for a plurality of priority-value-based qualitative responses for a plurality of user devices in a communication environment.

SUMMARY OF THE INVENTION

Accordingly, the inventor has conceived and reduced to practice, in a preferred embodiment of the invention, a system and method comprising a network-connected interest clustering computer comprising a processor, a memory, and programming instructions, the programming instructions, when executed by the processor, cause the processor to receive, at a project controller, a question object, from a leader device, comprising an arrangement of information, distributing the question object to a plurality of participant devices and receiving a plurality of thought objects (each comprising additional arrangements of information) from the plurality of participant devices; computing a distribution strategy for the plurality of thought objects, and redistributing, by the project controller, the plurality of thought objects to at least a portion of the participant devices; then receiving a plurality of priority values from at least a portion of the plurality of user participant devices, whereby the plurality of priority values are each associated to a thought object. Next, in the case of a non-zero quantity of thought objects, non-zero quantity of participant objects and non-zero quantity of priority values the systems and methods disclosed herein may, in a preferred embodiment, filter and cluster thought objects and participant objects into interest clusters based upon a plurality of priority values assigned by the plurality of participant devices to a plurality of thought objects. For example, the clustering may be used to identify one or more thought objects that receive opposing priority value responses associated to different participant objects in order to present a plurality of thought objects representing a diverse set of thoughts to all participants. In some embodiments, or could be used to analyze an entire body of data to automatically group thought objects into sets of interest groups without requiring human input whereby an interest group may represent a collective understanding of what may be most important to at least a portion of a group of users associated to participant devices, for example, across dispersed groups such that understanding of concepts and perspective using accurate priority-based indicators from a plurality of participant devices by a plurality of users.

Systems and methods disclosed herein evaluate raw input from the plurality of devices in order to permute the data to compute alignment for a at least a portion of the devices into interest-based clusters of thought objects and participant devices.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

DETAILED DESCRIPTION

Figure 1:
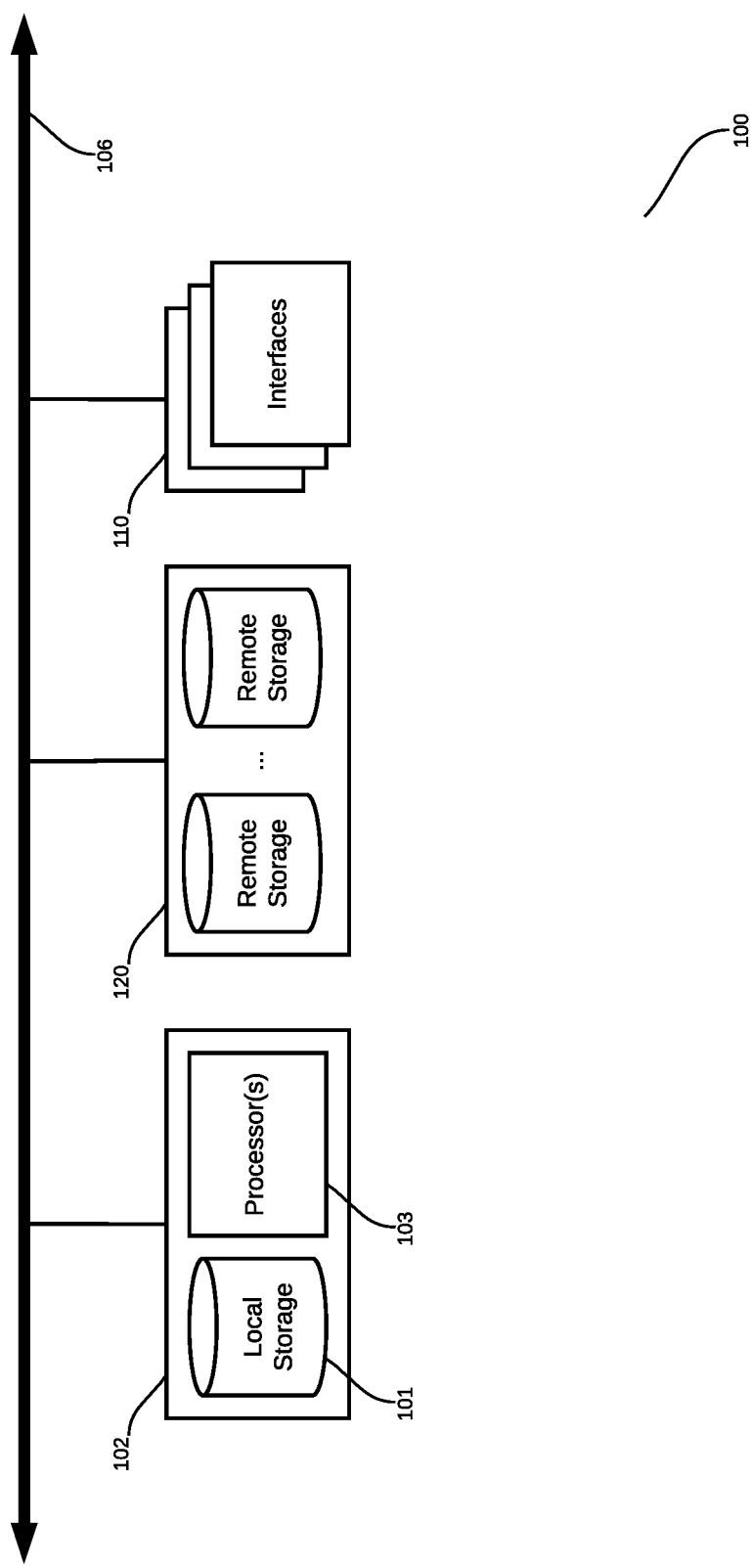
FIG. 1 is a block diagram illustrating an exemplary hardware architecture of a computing device used in an embodiment of the invention.

The inventor has conceived, and reduced to practice, a system and method for computing interest clusters for a plurality of qualitative responses assigned to a plurality of thought objects from a plurality of user devices.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

A priority value, as referred to herein, is a response received from a user device and may be a scale represented by one or more stars, representations, or numbers (such as a Likert scale or a zero-centered scale, or the like). In some embodiments, a zero-priority value is a value usable by the system. In some embodiments, the scale is normalized, in other embodiments the scale is a standard scale that may or may not include negative values. In other embodiments, a priority value scale may be a plurality of graphical elements indicating a spectrum of dislike to like, interest or sentiment level, or the like). In some embodiments, graphical scales are converted to a numeric scale for calculation purposes.

Cohorted as referred to herein refers to a description of, for example, one or more thought objects 510 and/or participant objects 575 combined with other like-objects into a cohort. In some embodiments, cohorted may refer to an action, by for example, a project controller or another component, to move one or more participant or thought objects into a like-group of other participant objects 575 and/or thought objects 510.

In some embodiments, assigned, as referred to herein, for example, with respect to a participant object 575 assigning a priority value to a thought object, may refer to priority values that may have been received by a device 720 and associated to a thought object 510, the device 720 associated to the participant object 575.

Rating, as referred to herein, may be a priority value response received from a device 720 associated to a participant object 575. Ratings may be a numeric value on a scale indicating a range of possible responses available to assign to a thought object 510.

Hardware Architecture

Generally, the techniques disclosed herein may be implemented on computing hardware or a combination of programming instructions and hardware to form a specially programmed computer. For example, they may be implemented in an operating system kernel, in a separate user process, in a library package bound into network applications, on a specially constructed machine, on an application-specific integrated circuit (ASIC), or on a network interface card.

An implementation based on programming instructions and hardware may describe at least some of the embodiments disclosed herein and may be implemented on a programmable network-resident machine (which should be understood to include intermittently connected network-aware machines) selectively activated or reconfigured by computer program instructions stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, wearable device, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (for example, a peripheral component interconnect (PCI) bus). When acting under the control of appropriate software or firmware, CPU 102 (i.e. processor) may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
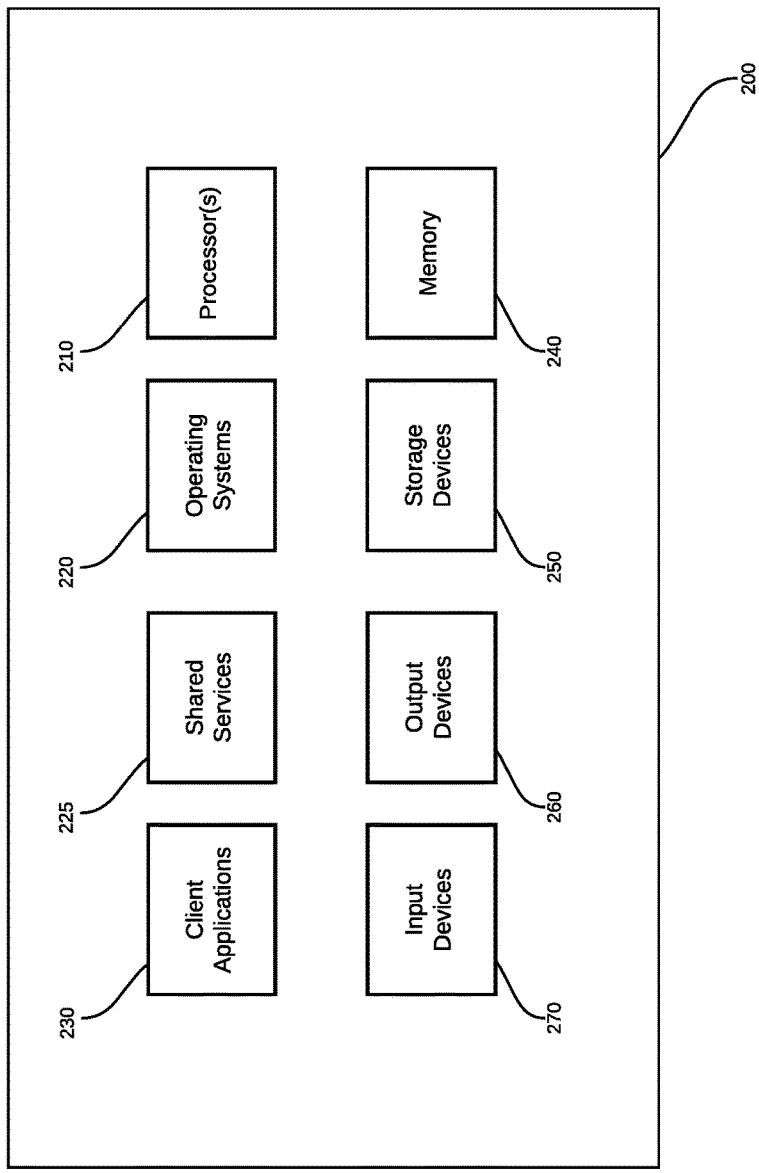
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
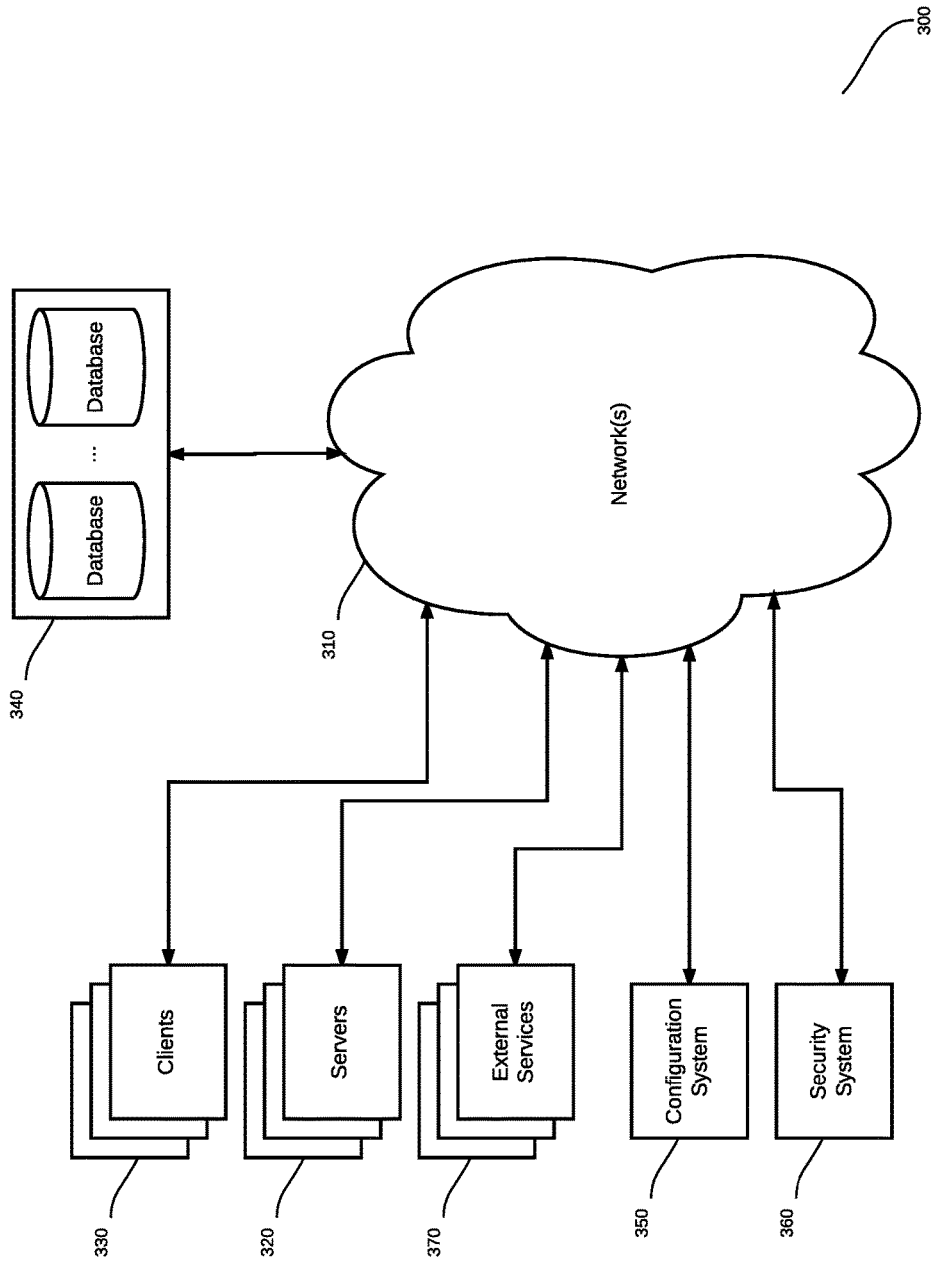
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
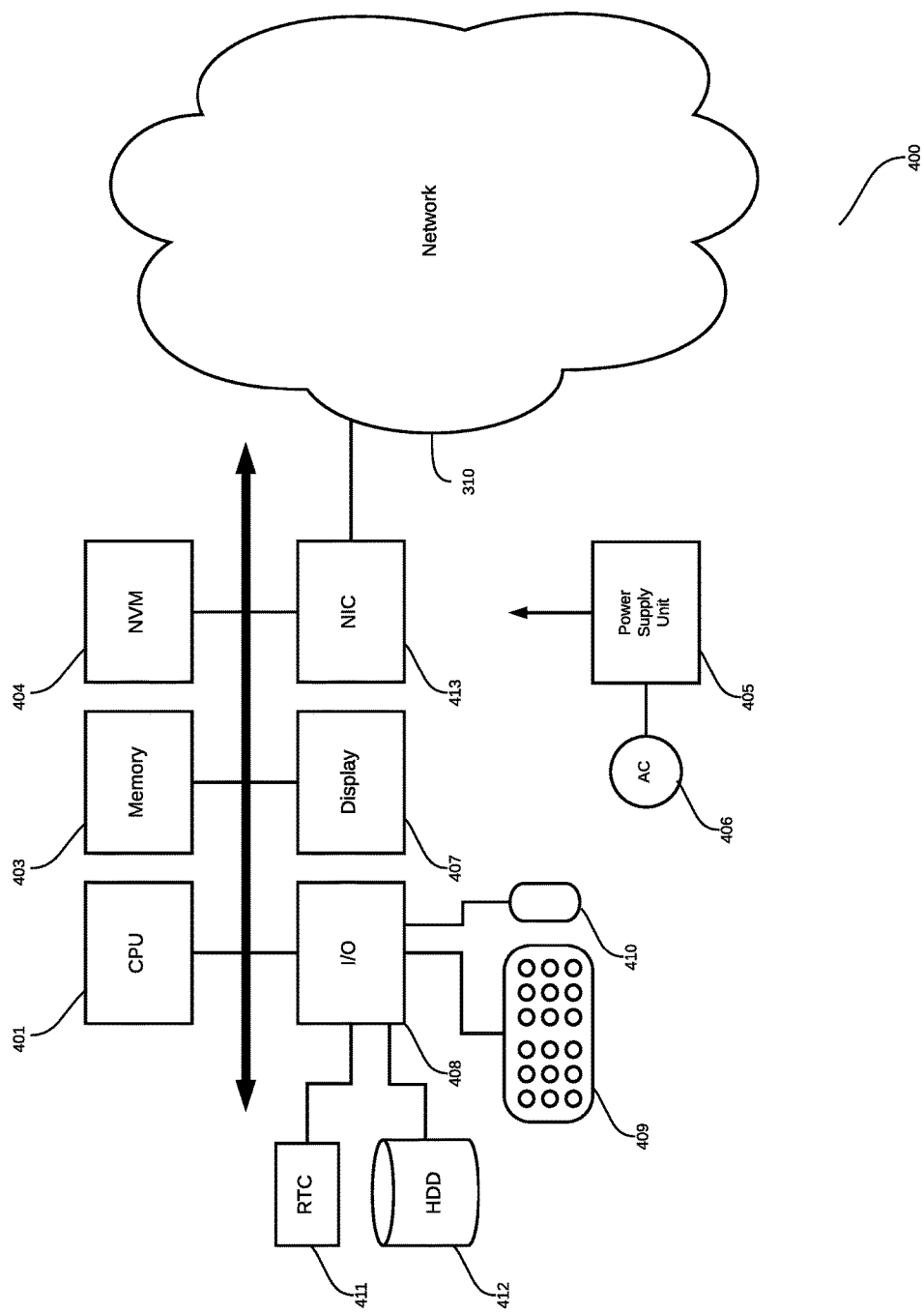
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 310, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

Figure 5:
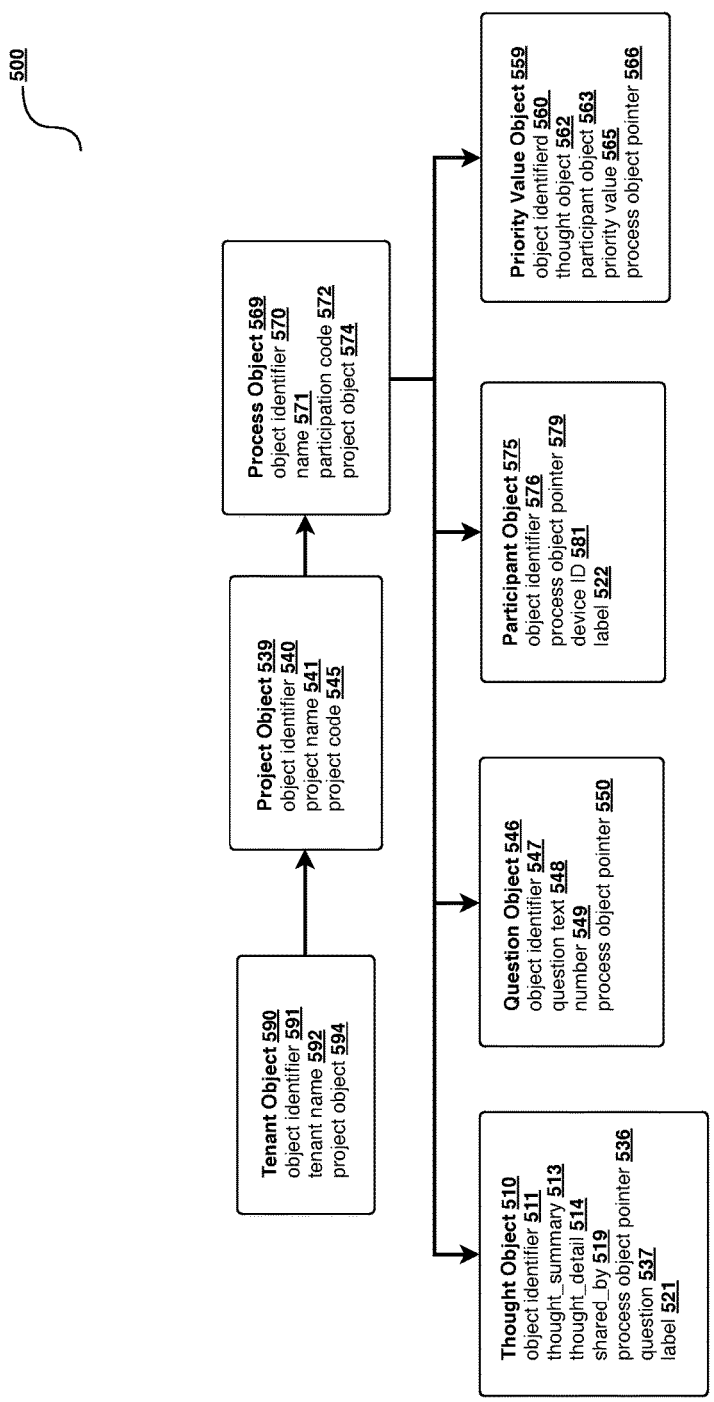
FIG. 5 is a plurality of objects used for an analysis of qualitative patterns for a plurality of priority values associated to a thought object to compute clusters of interest, according to a preferred embodiment of the invention.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.
Conceptual Architecture FIG. 5 is a plurality of objects used for an analysis of qualitative patterns for a plurality of priority values associated to a thought object to compute clusters of interest, according to a preferred embodiment of the invention. According to the embodiment, a plurality of programming instructions stored in memory 240 that when executed by at least one processor 210 comprise a plurality of objects that may comprise data, in the form of fields, often known as attributes and programming instructions, in the form of procedures, often known as methods. Objects 500 may be arranged such that procedures can access and often modify one or more data fields of an associated object. In various embodiments, programming instructions enable objects to interact with one another. In a preferred embodiment, objects 500 may be implemented in an object-relational database management system, for example PostgreSQL.

Accordingly, It can be appreciated that an understanding of a plurality of priority values received from a plurality of participant devices 720 provides a means for large scale involvement of users via devices 720 in a networked environment to participate in a quantitative fashion to evaluate thoughts that require an understanding of interest regardless of device location, temporal displacement (i.e. when the respondents responded), psychology (willingness to provide responses in an open forum, or requirement for anonymity), and the like. An interest categorization may represent a collective understanding of what may be most important to at least a portion of a group of users associated to devices 720, for example, across dispersed groups such that understanding of concepts and perspective using accurate priority-based indicators from a plurality of participant devices 720 by a plurality of users.

Tenant object 590 may be a plurality of programming instructions stored in memory 240 that when executed by one or more processors 210 describe a tenant of system 700, that is, a configured entity that may execute a plurality of projects described by one or more associated project objects 539 for analysis of interest for a plurality of priority values received from a plurality of participant devices 720 associated to one or more thought objects 510. Accordingly, one or more projects objects 539 that are associated to the tenant object 590 are connected by project object pointer 594. In a preferred embodiment, tenant object 590 may comprise: an object identifier 591 whereby each instantiation of tenant object 590 may be referred to uniquely within the system; tenant name 592 may be a text description of the instant tenant object 590; project object pointer 594 (described above) comprises one or more pointers to one or more project objects 539. Said differently, system 700 may configure multiple tenant objects 590 whereby each tenant object 590 may be associated to a plurality of project objects 539 whereby each associated project object 539 is associated to a plurality of other objects 500 (depicted in FIG. 5) to enable analysis of qualitative patterns for a plurality of priority values received from a plurality of participant devices 720. It should be appreciated that participant devices 720 may be at least a portion of devices 720. In a preferred embodiment, participant devices 720 may be devices that, through network 310, provided responses to, for example, a question object 546 and/or thought objects 510. In some embodiments, leader devices 722 (referring to FIG. 6) may be considered participant devices 720.

Project object 539 may be a plurality of programming instructions stored in memory 240 that when executed by processors 210 describe a project for an analysis of qualitative patterns for a plurality of priority values received from a plurality of participant devices 720 based on one or more thought objects 510 whereby a project may be a planned collaborative executions of the methods described herein utilizing one or more specially programmed components 700 (referring to FIG. 6) to determine a plurality of cohorts of participant devices 720, and, in some embodiments, interest alignment of one or more participant devices 720 and/or thought objects 510 using priority values from a plurality of participant devices 720 as directed by, in some embodiments, a leader device 723. Project object 539 may comprise: object identifier 540 which may be a globally unambiguous persistent identifier representing an instance of project object 539; project name 541 may be textual description of the instance of the project object 539; project code 545 may be unique identifier associated to a project object 539. Thought object 510 may be a plurality of programming instructions stored in memory 240 that when executed by processors 210 comprise an arrangement of information in the form of ideas received from a device 720 whereby an analysis of qualitative patterns for a plurality of priority values received in response to the arrangement of information from a plurality of participant devices 720. Thought object 510 may comprise: object identifier 511 which may be a globally unambiguous persistent identifier representing an instance of thought object 510; thought summary 513 may be an arrangement of information corresponding to a qualitative response from a device 720 to another arrangement of information in the form of an open-ended question from, for example, a question object 546; thought_detail 514 may be an additional arrangement of information corresponding to an additional qualitative response from a device 720, for example, an explanation of the importance of the qualitative response represented by thought summary 513; shared by 519 is a pointer to a participant object 575 who shared the instant thought object 510; process object pointer 536 may be a pointer to an associated process object 569; question 537 may be a pointer to an associated question object 546 to, for example, have access to the question object 546 through its memory address instead of a new object being created on a stack; label 521 may be a binary label (for example, true or false) or a positive/negative label (for example, +1, −1) used for cohort assignment calculations.

Question object 546 may be a plurality of programming instructions stored in memory 240 that when executed by processors 210 comprise details around the associated arrangement of information associated to a corresponding an open-ended question by, for example, as configured by a leader device 722, the arrangement of information being a point of origination for which a plurality of thought objects 510 result, are distributed by project controller 702, and for which a plurality of priority value responses are solicited from at least a portion of devices 720 to perform an analysis of qualitative patterns, and to cluster participant devices 720 into interest cohorts. Question object 546 may comprise, at least: object identifier 547 which may be a globally unambiguous persistent identifier representing an instance of question object 546; question text 548 may be an arrangement of information comprising textual description in the form of an open-ended question; number 549 may be an additional unique identifier for the instant question object 546 that may indicate an index of the instant question in a sequence or series of related question objects in a project object 539; process object pointer 550 may be a pointer to an associated process object 569, for example, to have access to the process object 569 through its memory address instead of a new object being created on a stack.

Priority value object 559 may be a plurality of programming instructions stored in memory 240 that when executed by processors 210 comprise an object describing details around a priority value received from a participant device 720. It should be noted that in a typical analysis, a plurality of priority value objects may be associated to a thought object 510 for an analysis of qualitative patterns as described throughout this specification. Priority value object 559 may comprise: object identifier 560 which may be a globally unambiguous persistent identifier representing an instance of priority value object 559; thought object 562 may be a pointer to a corresponding thought object 510, for example, to have access to the an associated thought object 510 through its memory address instead of a new object being created on a stack; participant 563 is a pointer to Participant object 575 that assigned priority value 565 (mentioned below); priority value 565 may be a numeric identifier of the priority value received from a corresponding participant device 720 associated to the participant object 575 referenced in participant pointer 563 (in some embodiments, priority value 565 may be an alphanumeric value, a Boolean, an identifier to an emoticon or some other graphical representation, or the like); process object 566 may be a pointer to a process object 569 to, for example, have access to the process object 569 through its memory address instead of a new object being created on a stack.

Process object 569 may be a plurality of programming instructions stored in memory 240 that when executed by processors 210 comprise an object describing a process corresponding to a project object 539 for an analysis of qualitative patterns. A process may provide a procedure for how a project is to be executed, for example, how thought objects 510 will be distributed, how responses are received and processed, and the like. Process object 569 may comprise: object identifier 570 which may be a globally unambiguous persistent identifier representing an instance of process object 569; name 571 may be textual description of the instance of the process object 569; number 572 may be an additional unique identifier associated to the instant process object 569; project object 574 may be a pointer to a corresponding project object 539 to, for example, have access to the project object 539 through its memory address instead of a new object being created on a stack.

Participant object 575 may be a plurality of programming instructions stored in memory 240 that when executed by processors 210 comprises an object to describe a participant associated to a participant device 720 (that is, each participant object corresponds to a corresponding device 720). In some embodiments, participant objects may be assigned to devices 720 that have participated (for example, provided priority values to one or more thought objects, or provided one or more thought objects 510 in response to a question object 546). Participant object 575 may comprise, at least: object identifier 576 which may be a globally unambiguous persistent identifier representing an instance of participant object 575; process object 579 may be a pointer to an associated process object 569 to, for example, have access to the process object 569 through its memory address instead of a new object being created on a stack; project object 580 may be a pointer to a project object 539 to, for example, have access to the project object 539 through its memory address instead of a new object being created on a stack; device ID identifies an associated user device 720; label 522 may be a binary label (for example, true or false) or a positive/negative label (for example, +1, −1) used for cohort assignment calculations.

It should be noted that, in a preferred embodiment, a tenant object 590 may represent properties and methods corresponding to a user, or group of users, of the system (for example, a company, organization, or the like). Each tenant object 590 may be associated to one or more project object 539 that may provide details around a project for exchanging information following one or more processes associated to one or more process objects 569 whereby at least one question object 546 and a plurality of thought objects 510 describe an interaction by devices 720 (at least a portion of which are associated to a participant objects 575) whereby interaction comprises, at least, an assignment of priority values 559 to thought objects 510.

Figure 6:
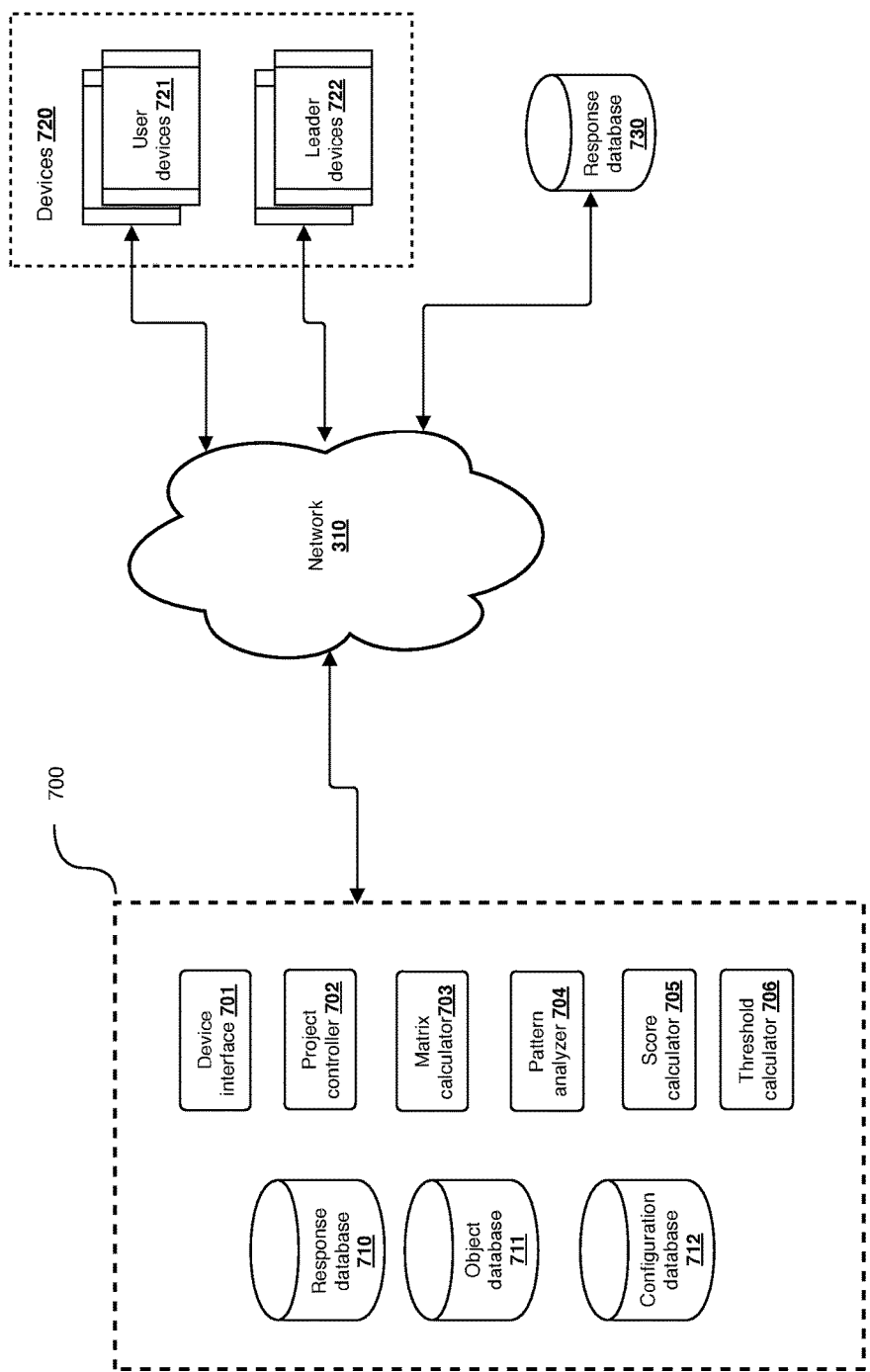
FIG. 6 is a block diagram illustrating an exemplary conceptual architecture of an interest clustering computer, according to a preferred embodiment of the invention.

FIG. 6 is a block diagram illustrating an exemplary conceptual architecture of an interest clustering computer, according to a preferred embodiment of the invention. According to the embodiment, clustering environment 700 comprises a plurality of components each comprising at least a plurality of programming instructions, the programming instructions stored in a memory that when executed by a processor, cause the processor to perform operations disclosed herein. In a preferred embodiment, a question object 546 is received at a project controller 709 from a first leader device 722. The question object 546 may then be distributed, by project controller 702 to at least a portion of a plurality of devices 720, subsequently, a plurality of thought objects 510 may be received from at least a portion of the at least portion of the plurality of devices 720 whereby the thought objects 510 may be redistributed to at least a portion of the plurality of devices 720 with a request for an assignment, by at least a portion of the plurality of user participant devices 720, of one or more priority values. It should be appreciated that questions objects 546 when received from a leader device 722, the objects and associated parameters are stored in object database 711. Similarly, thought objects 510 received from the at least portion of the at least portion of the plurality of devices 720 may be stored in object database 711. In some embodiments, one or more priority value objects 559 comprising the one or more priority values associated to a corresponding thought object 510 of the plurality of thought objects 510 are received. In some embodiments, project controller 702 processes based at least in part on configuration within project object 539 and process object 569.

Once project controller 702 processes the plurality of priority value objects 559 for the plurality of thought objects 510 from the plurality of devices 720, interest clusters of thoughts and participants may be computed by, at least, matrix calculator 703, pattern analyzer 704, and score calculator 705 based on, at least, a portion of the plurality of thought objects 510, a portion of the plurality of participant objects 575, and a portion of the plurality of priority value objects 559, using systems and methods described herein. It should be appreciated that question object 546 and at least a portion of the plurality of thought objects (and associated other objects 500 and 600) are associated to at least one project object 539. In a preferred embodiment, a tenant object 590 may have one or more associated projects 539, that is, that a tenant may perform a plurality of mutually exclusive projects to understand the dynamics and behaviors of a plurality of users via a plurality of devices. Though in a preferred embodiment, projects are self-contained in nature (in terms of analyses that are performed), it should be appreciated that in some embodiments, projects may be interrelated, and calculations by system 700, may be performed across a plurality of projects.

According to some embodiments, each thought object 510 must meet certain criteria in order to qualify for inclusion into an interest cluster calculation. These criteria are combinations of meeting (or failing to meet) certain thresholds, as computed by threshold calculator 706, for certain associated priority values 565 from a plurality of priority value objects 559. Threshold levels may be dynamically computed by threshold calculator 706, received from a first leader device 723, pre-configured from a configuration database 712, a combination thereof, or from other computed or pre-configured source.

Device interface 701 manages input/output communications to devices 720, and in some embodiments, to response database 730, over network 310.

Project controller 702 manages an execution of a thought object exchange project whereby project controller 702 manages receiving and distributing question objects 546 to devices 720, manages receiving and distributing thought objects 510, and receiving and distributing priority value objects 559 via device interface 701.

In a preferred embodiment, matrix calculator 703 may convert a raw priority value response matrix to a plurality of interest-based submatrices arranged in positive, negative, or some other interest-based arrangement. In some embodiment, matrix calculator 703 computes entirely new submatrices while in other embodiments, matrix calculator 703 may provide masks, indices, or other referential identifiers such that a desired result is easily viewable or usable in computations. Further, matrix calculator 703 may receive priority value responses from a plurality of network-connected devices 720 from device interface 701 via network 310. In some embodiments, matrix calculator receives a plurality of priority value objects from response database 712 (or remote response database 730) whereby a plurality of priority values may have been previously assigned to priority value objects 559 and stored in response database 712 (or remote response database 730). In addition to converting, computing, indexing and masking matrices, in some embodiments, matrix calculator 703 may create and manage arrays of priority values and labels. In some embodiments, matrix calculator 703 may manage cohorted objects by adding, merging, deleting, and labeling (for example, via label 521 and label 522) thought objects 510 and participant objects 575, as well as determine weak cohorts, and the like. It should be appreciated that cohorted may refer an association of one or more thought objects 510 into a group based on like patterns (for example, similar priority values received by similar participant objects 575). In some embodiments, cohorted may refer to an association of one or more participant objects 575 based on like patterns (for example, similar priority values provided, or associated to, similar thought objects 510).

According to a preferred embodiment, pattern analyzer 704 may analyze a plurality of priority value and label patterns associated to a plurality of thought objects 510 associated to a plurality of participant objects 575. In some embodiments, pattern analyzer 704 compares cohort indices and performs calculations to analyze, match, merge, add, and remove thought objects 510 and participant objects 575 into cohorts. In some embodiments, pattern analyzer 704 computes agreement of label conditions for one or more matrices/arrays associated to a plurality of thought objects 510 and/or a plurality of participant objects 575.

According to a preferred embodiment, score calculator 705 may compute a plurality of scores, cohort labels, for comparison and computation according to methods outlined herein. Scores computed by score calculator 705 may include, but not limited to, a polarization score for each thought object 510 that may indicate how polarizing the thought may be. For example, a thought object with a high polarization score may indicate that received priority values appear at each end of the spectrum that may denote different interests from a plurality of participant objects 575 (associated to a plurality of devices 720), which may, in some embodiments, be equal to the sum of the absolute value of the priority values (shifted to a magnitude scale centered around a zero value) assigned to the instant thought object 510, minus the absolute value of the sum of priority values (shifted to a magnitude scale centered around a zero value) assigned to the instant thought object 510. For example, a first thought object 510 received priority values 5, 2, 3 and 1 on a Likert scale of 1 to 5 (from a plurality of devices 720), which, according to the embodiment, may correspond to priority values +2, −1, 0 and −2 respectively (after having subtracted 3 to shift to a magnitude scale of −2 to +2, centered around a zero value). The absolute priority values are therefore 2, 1, 0 and 2 respectively, and the sum of the absolute priority values is 2+1+0+2=5. Further, the sum of the priority values is 2+−1+0+−2=−1, and the absolute value of the sum of the priority values is 1. Therefore, the polarization score for the first thought object 510 is 5−1=4.

Scores computed by score calculator 705 may further include, but not limited to, a passion score for one or more participant object 575 and/or one or more cohorts, indicating a level of passion for the one or more participants (or cohort) based on priority values received from a plurality of associated devices. A passion score may be calculated, in some embodiments, to be equal to the sum of the absolute value of the priority values (shifted to a magnitude scale centered around a zero value) assigned by an associated participant object 575. For example, suppose a first participant object 575 assigned priority values 1, 5, 2 and 2 on a Likert scale of 1 to 5, which correspond to priority values −2, +2, −1 and −1 respectively (after having subtracted 3 to shift to a magnitude scale of −2 to +2, centered around a zero value). The absolute priority values are therefore 2, 2, 1 and 1 respectively, and the sum of the absolute priority values is 2+2+1+1=6.

Scores computed by score calculator 705 may further include, but not limited to, a participant-cohort compatibility score that may be a measure of how closely a participant object 575 fits within a cohort, for example, based on a similarity of patterns of priority values assigned to one or more thought objects 510 by the instant participant object 575. In some embodiments, a participant-cohort compatibility score may be calculated by the sum of the 522 cohort label associated to the participant object 575 multiplied by an associated priority value for each thought object 510 multiplied by the 521 cohort label associated to an associated thought object 510. For example, suppose a participant object 575, having been assigned a 522 label of +1, assigned priority values of 5, 4, 2 and 1 on a Likert scale of 1 to 5, which correspond to priority values +2, +1, −1 and −2 respectively (after having subtracted 3 to shift to a magnitude scale of −2 to +2, centered around a zero value) to a set of thought objects 510 with 521 cohort labels of +1, +1, −1 and −1. The summation of the multiplied values would be (+1*+2*+1)+(+1*+1*+1)+(+1*−1*−1)+(+1*−2*−1)=2+1+1+2=+6. It should be noted that a participant object 575 assigning a priority value is synonymous to a priority value being assigned and/or received by a device 720 that is associated to the participant object 575.

Scores computed by score calculator 705 may further include, but not limited to, a thought-cohort compatibility score that may be a measure of how closely a thought object 510 fits within a cohort, for example, based on a similarity of patterns of priority values assigned to the selected thought object 510 by the cohorted participant objects 575. In some embodiments, a thought-cohort compatibility score may be calculated by the sum of the 521 cohort label associated to the thought object 510 multiplied by an associated priority value from each cohorted participant object 575 multiplied by the 522 cohort label associated to each associated participant object 510. For example, suppose a thought object 510, having been assigned a 521 label of +1, received priority values of 4, 4, 5 and 1 on a Likert scale of 1 to 5, which correspond to priority values +1, +1, +2 and −2 respectively (after having subtracted 3 to shift to a magnitude scale of −2 to +2, centered around a zero value) from a set of participant objects 575 with 522 cohort labels of +1, +1, +1 and −1. The summation of the multiplied values would be (+1*+1*+1)+(+1*+1*+1)+(+1*+2*+1)+(+1*−2*−1)=1+1+2+2=+6.

Threshold calculator 706 may compute a plurality of threshold values associated to including or removing objects 500 and 600 from computations by other objects 700. Thresholds may be computed using historical results as stored in response database 711 utilizing machine learning to provide an ability to learn optimal threshold values without being explicitly programmed. That is, programming instructions may change when exposed to new priority values whereby threshold calculator 706 may search through historical data for patterns and automatically adjust thresholds according to specific embodiments. In some embodiments, threshold calculator 706 may be supervised by receiving input from leader device 722, or function in an unsupervised state whereby different threshold levels are provided or influenced by leader devices 722. In some embodiments, a supervised algorithm may apply what has been learned in past projects from within system 700 to new data; and an unsupervised algorithm may draw inferences from historical datasets stored in response database 711. In some embodiments, threshold calculator 706 is operable to provide automatic adaptive thresholding whereby thresholding adapts based on output, newly received information, or some other processing condition. In some embodiments, threshold calculator 706 retrieves preconfigured threshold values from configuration database 712.

Response database 710 may store received response information from the plurality of devices 720. In some embodiments, response database holds just priority value responses while in others, priority value responses are held in priority value objects 559. Object database 711 may provide database storage for objects 500 and 600 both pre-configured and objects with assigned data fields. Configuration database 712 provides storage for systems configuration components, for example, at least, configuration for devices 720, system components 700, and the like. It can be appreciated by one with ordinary skill in the art that the above referenced databases provide an exemplary set of databases required to implement system 700 components and data necessary to execute the disclosed methods.

Devices 720 comprise user devices 721 and leader devices 722. A leader device 722 may configure a project object 539 associated to one or more question objects 546 to solicit a plurality of thought objects 510 based on an arrangement of information in the form of an open-ended free-flow question for the purpose of receiving priority value responses received, by project controller 702, from at least a portion of plurality of participant devices 720 (whereby the at least portion of devices may be hereinafter referred to as participant devices 720) and stored in a plurality of priority value objects 559 for analysis by system 700. In a preferred embodiment, leader devices 722 may initiate and manage a project (as defined in a project object 539 that comprises one or more question objects 546 via a process defined in process object 569) and at least a portion of user devices 721 (i.e. those that have responded, comprise participant objects 720. In other embodiments, leader devices 722 may be considered participant devices and may act as both a leader device 722 and a user device 721.

Detailed Description of Exemplary Embodiments

Figure 7:
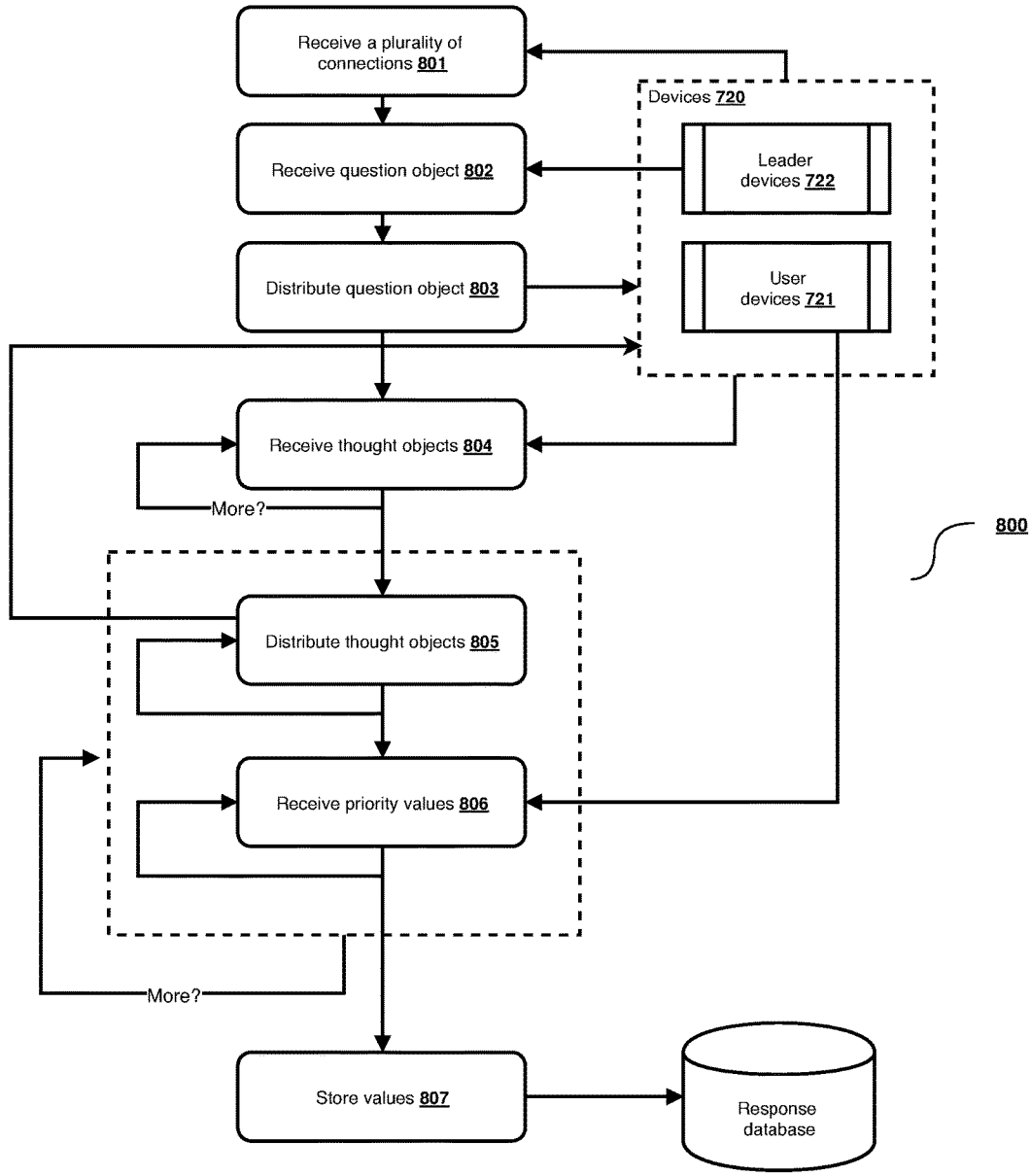
FIG. 7 is a flow diagram illustrating a method for conducting a process to solicit thought objects and priority value responses from a plurality of devices, according to a preferred embodiment of the invention.

FIG. 7 is a flow diagram illustrating a method for conducting a process to solicit thought objects and priority value responses from a plurality of devices, according to a preferred embodiment of the invention. According to the embodiment, in a first step 801, a plurality of connections from a plurality of devices 720 are received via network 310 at device interface 708 to enable communication between system 700 and connected devices 720 and remote response database 730. In a next step 802, question object 546 is received, by project controller 702, from a first leader device 722 via device interface 701 to begin a process to solicit thought objects and priority value responses. It should be appreciated that question object 546 may be associated to a previously configured project object 539 and belong to a tenant object 590. Question object 546 may comprise an arrangement of information comprising open-ended free-form text arranged in a manner whereby responses from at least a portion of user devices 721 may be solicited (for example, arranged in the form of a question), the expected responses comprising a plurality of thought objects 510. In a next step 803, project controller 702 may then distribute question object 546 to at least a portion of devices 720 via device interface 710 on network 310. In a next step 804, a plurality of thought objects 510 may be received by at least a portion of devices 720, the plurality of thought objects 510 each comprising, at least, an arrangement of thought information (for example, within thought_detail 514), the arrangement of thought information comprising open-ended free-form text arranged in a manner whereby responses from at least a portion of user devices 721 may be solicited, the expected responses comprising a plurality of priority value objects 559, each priority value object 559 comprising priority value 565 comprising a priority value associated to a thought object (for example thought object 562 may associate priority value 565 to a corresponding thought object 510). In a next step 805, the plurality of thought objects 510 may be distributed, by project controller 702, to at least a portion of user devices 720 via device interface 710 on network 310, utilizing a thought selection algorithm that comprises prioritizing a plurality of thought objects 510 with the least number of distributions whilst also prioritizing at least a portion of thought objects 510 for distribution to one or more user devices 720 that may have originally submitted the plurality of thought objects 510. In a next step 806, project controller 702 may receive a plurality of priority value objects 559 (herein referred to as priority value responses) from at least a portion of devices 720, the plurality of priority value responses each associated to a corresponding thought object 510 (as described previously), the at least portion of responding devices 720 herein referred to as participant devices 720, each priority value response associated to a corresponding thought object 510 and a corresponding participant device of the participant devices 720. In a next step 807, project controller 702 may store the plurality of thought objects 510 and associated priority value responses in response database 710 (in some embodiments, project controller 702 may store the plurality of thought objects 510 and associated priority value responses in remote response database 730 via network 310). In a preferred embodiment, priority value responses may be stored in a matrix arrangement associating the priority value response to the corresponding thought object 510 on a y-axis and a corresponding participant on an x-axis (as described in FIG. 8).

Figure 8:
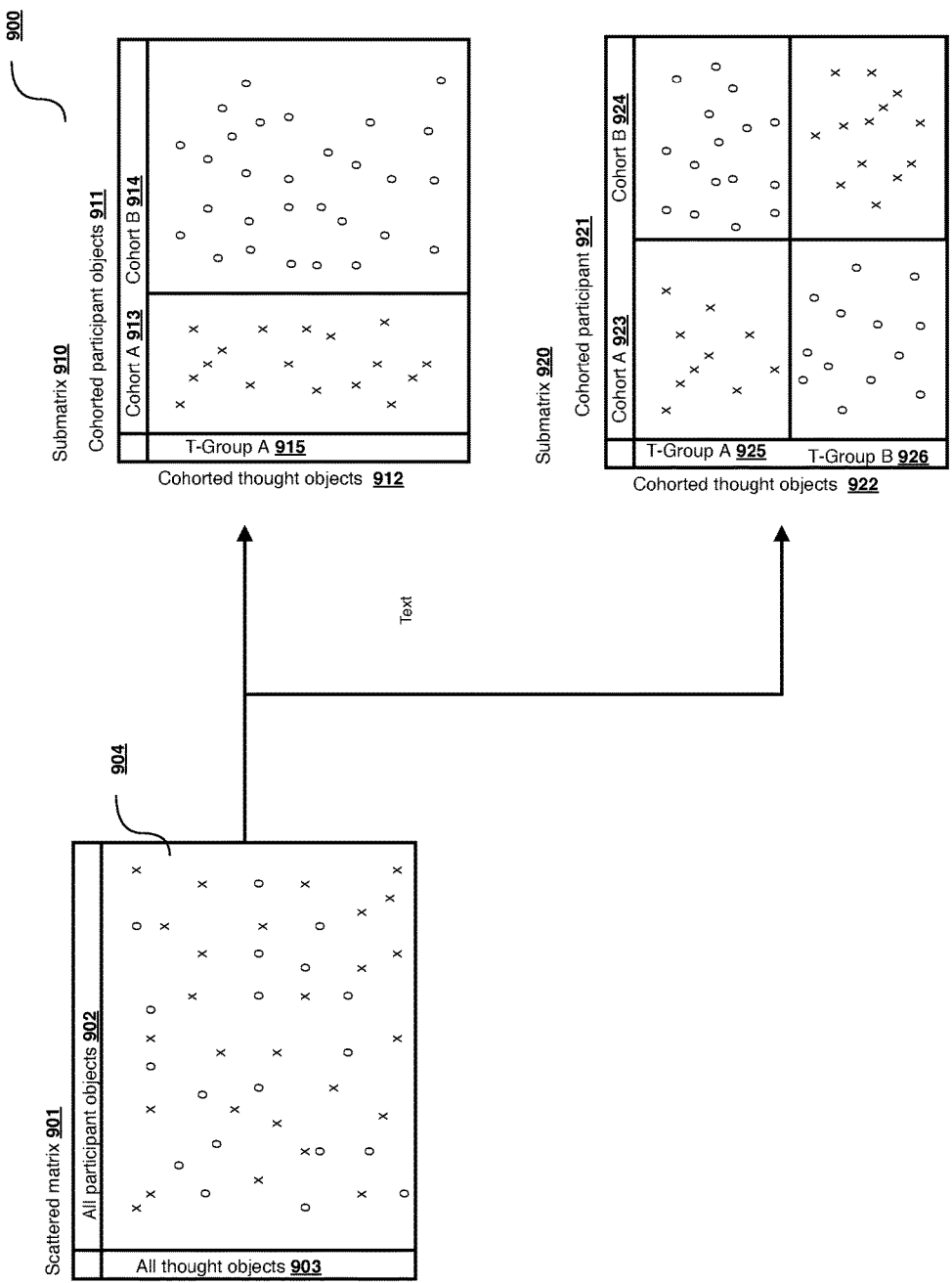
FIG. 8 is a graphical illustration of a scattered matrix of priority value responses associated to a plurality of participant devices permuted into interest-based grouped submatrices, according to a preferred embodiment of the invention.

FIG. 8 is a graphical illustration of a scattered matrix of priority value responses associated to a plurality of participant devices permuted into interest-based grouped submatrices, according to a preferred embodiment of the invention. According to the embodiment, a scattered cartesian graph 901 comprising x and y axes corresponding to thought objects 510 and participant objects 575 is disclosed whereby elements at an x, y coordinate 904 may each be a priority value response for a corresponding thought object 510 at the y-coordinate on a y-axis thought objects 903, received from a corresponding participant object 575 at the x-coordinate on x-axis participant objects 902. In a preferred embodiment, priority value responses may be a cardinal number on a Likert scale indicating a priority value assigned by the respective participant device 720 to the respective qualitative response (i.e. thought object 510), for example, a five-point scale from 1 to 5, whereby an "x" in an x-y coordinate of elements 904 may be priority values representing a "high rating" (for example, 4 or 5 in the exemplary five-point scale) and an "o" in an x-y coordinate of elements 904 may be priority values representing a "low rating" (for example, a 1 or 2 in the exemplary five-point scale). In some embodiments, a priority value response may be a normalized value between 0 and 1, for example via computing the normalized value as (priority value response−min)/(max−min). In some embodiments, a priority value response may be scaled as a magnitude (for example, −2, −1, 0, 1, 2), and the like. It can be appreciated by one having ordinary skill in the art that any scale may be used to represent a priority value response whereby positions on the scale may represent a range of interest to an associated thought object 510. In other embodiments, the scale may represent other ranges, for example, low to high resonance, low to high preference, a series of graphical icons, and the like.

In some embodiments, a conversion of scattered matrix 901 (herein also referred to as raw matrix 901) into an interest-based arrangement submatrix 910 may illustrate a permutation, by matrix calculator 703, of rows from scattered matrix 901 to group participant objects 911 based on priority values received from associated user devices 720 for corresponding thought objects 510 such that participant objects are grouped by cohort A 913 or cohort B 914 (identified by their associated participant-cohort label 522) based on priority values for the associated thought group A 915 (identified by their associated thought-cohort label 521). Accordingly, each respective participant object 575 along the x-axis may be associated to cohort 913 or 914 based on an analysis of priority values associated to qualitative responses that the grouped participant objects shared, most closely aligned, or related assigned in accordance to an association-level (for example, as described in FIG. 9-17). According to the embodiments, an "x" in columns of cohort A 913 may be priority values representing a "high rating" (for example, 4 or 5 in the exemplary five-point scale) and an, "o" in columns for cohort B 914 may be priority values representing a "low rating" (for example, a 1 or 2 in the exemplary five-point scale). Accordingly, participant objects 575 identified by participant objects on x-axis 911 under cohort B 914 may indicate an opposite interest for thought objects 510 identified (or belonging to) thought group A 915. Said differently, in some embodiments, the priority value responses in cohort B 914 sub-area represent an opposite interest than the priority value responses in the cohort A 913.

In some embodiments, a permutation of matrix 901 to an interest-based arrangement submatrix 920 illustrates a permutation, by matrix calculator 703, of rows from scattered matrix 901 to group participant objects 921 based on priority values received from associated user devices 720 for corresponding thought objects 510 such that participant objects 575 along x-axis participants 921 are grouped by cohort A 923 or cohort B 924 (identified by their associated participant-cohort label 522) based on priority values for the associated thought group A 925 and thought group B 926 (identified by their associated thought-cohort label 521). Accordingly, each respective participant object 575 along the x-axis may be associated to cohort 923 or 924 based on an analysis of priority values associated to qualitative responses that grouped participant objects may have shared, most closely aligned or related (e.g., with an association-level as described in FIGS. 9-17). According to the embodiments, an "x" in the columns of cohort A 923 may represent priority values indicating a "high rating" (for example, 4 or 5 in the exemplary five-point scale) and an, "o" in columns for cohort B 924 may represent priority values indicating a "low rating" (for example, a 1 or 2 in the exemplary five-point scale). Accordingly, participant objects 575 identified by participant objects on x-axis 921 under cohort B 924 may indicate an opposite interest for thought objects identified (or belonging to) thought group A 925. Similarly, an "x" in the columns of cohort B 924 may represent priority values indicating a "high rating" (for example, 4 or 5 in the exemplary five-point scale) for thought group B 926, and an, "o" in columns for cohort A 923 may represent priority values indicating a "low rating" (for example, a 1 or 2 in the exemplary five-point scale) for thought group B 926. Accordingly, participant objects 575 identified by participant objects on x-axis 921 under cohort B 924 may indicate an opposite interest for thought objects identified (or belonging to) thought group A 925; while at the same time, participant objects 575 identified by participant objects on x-axis 921 under cohort A 923 may indicate an opposite interest for thought objects identified (or belonging to) thought group B 926. Said differently, the priority value responses in cohort B 924 sub-area may represent an opposite interest than the priority value responses in the cohort A 923 for thought group A 925 and thought group B 926 indicating that the cohorts are polarized when considering both thought group A and thought group B.

In some embodiments an actual permutation of matrix 901 to submatrix 910 (or submatrix 921) is not a permuting of actual rows and columns of matrix 901, but rather by masking and indexing techniques known in the art to reference rows and columns to achieve a similar result.

Figure 9:
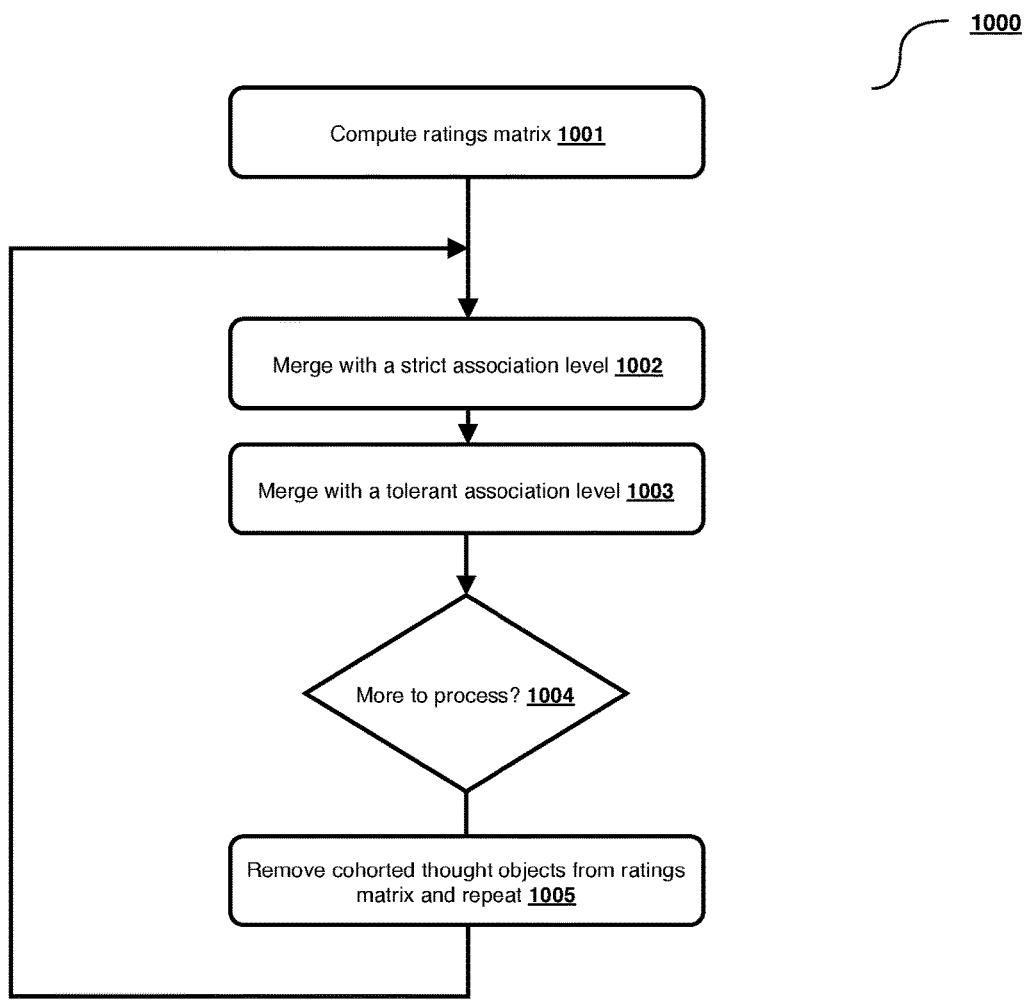
FIG. 9 is a flow diagram illustrating a method for clustering interest similarity for a plurality of priority values received from a plurality of participant devices, according to a preferred embodiment of the invention.

FIG. 9 is a flow diagram illustrating a method for clustering interest similarity for a plurality of priority values received from a plurality of participant devices, according to a preferred embodiment of the invention. According to the embodiment, in a first step 1001, matrix calculator 703 may receive a plurality of priority value responses from a plurality of participant devices 720 (for example, as described in FIG. 7) and store them into response database 710 in a structured format, for example, area 904 of matrix 901 whereby an x-axis 902 represents a plurality of participant objects 575 (each associated to an associated participant device 720) and y-axis 903 may represent a plurality of thought objects 510 of which the respective priority values are associated (as described in FIG. 10). In a next step 1002, priority value patterns associated to a plurality of thought objects 510 for each participant object 575 may be analyzed, by pattern analyzer 704, wherein at least a portion of the plurality of participant objects 575 may be merged (i.e. grouped) with a strict association level (that is, priority value patterns may be similar or exact in order to merge), for example, into an arrangement whereby strictly similar priority value patterns are associated by a cohort identifier. It should be appreciated that a strict similarity may be defined, in some embodiments, as an exact pattern (for example, the same sign of priority value, after having subtracted 3 to shift to a magnitude scale of −2 to +2, has been received for one or more related thought objects 510 by the would-be-merged participant objects 575). In other embodiments a pre-configured threshold may be set to determine a variance on a plurality of patterns to determine a merge for participant objects 575. In a preferred embodiment, step 1002 may result in two cohorts whereby strictly merged participants will belong to one of the two cohorts. In other embodiments, more than two cohorts may result. In a next step 1003, an analysis of priority value patterns associated to a plurality of thought objects 510 for each participant object 575 may be analyzed, by pattern analyzer 704, and at least a portion of the plurality of participant objects 575 may be merged (i.e. grouped) with a tolerant association level (that is, priority value patterns may be somewhat similar or tolerant in similarity for thought objects 510 and/or participant objects 575 in order to merge), for example, into an arrangement whereby somewhat similar priority value patterns are associated by a cohort identifier. It should be appreciated that a tolerant similarity may be defined, in some embodiments, as a priority value pattern with a variance in priority values (for example, priority values that may be 60-80% similar in pattern). In other embodiments a pre-configured threshold may be set to determine a larger variance on a plurality of patterns to determine a merge for participant objects 575. In a preferred embodiment, step 1003 results in an added membership of participant objects 575 to each cohort resulting from step 1002 and is further described in FIGS. 13-17. In a next step 1004, the cohorted thought objects 510 (i.e. thought objects with a 521 label of +/−1) and all associated priority value objects 559 are removed from the ratings matrix and processing continues at step 1002 until there are no more interest groups to be found within the plurality of thought objects 510 and participant objects 575. It should be appreciated that with each iteration of method 1000, a reduced selection of thought objects 510 are analyzed for the same participant objects 575 and then cohorted into alternative interest groups. In a next step 1005, cohorted thought objects are removed from the ratings matrix and method 1000 is repeated.

Figure 10:
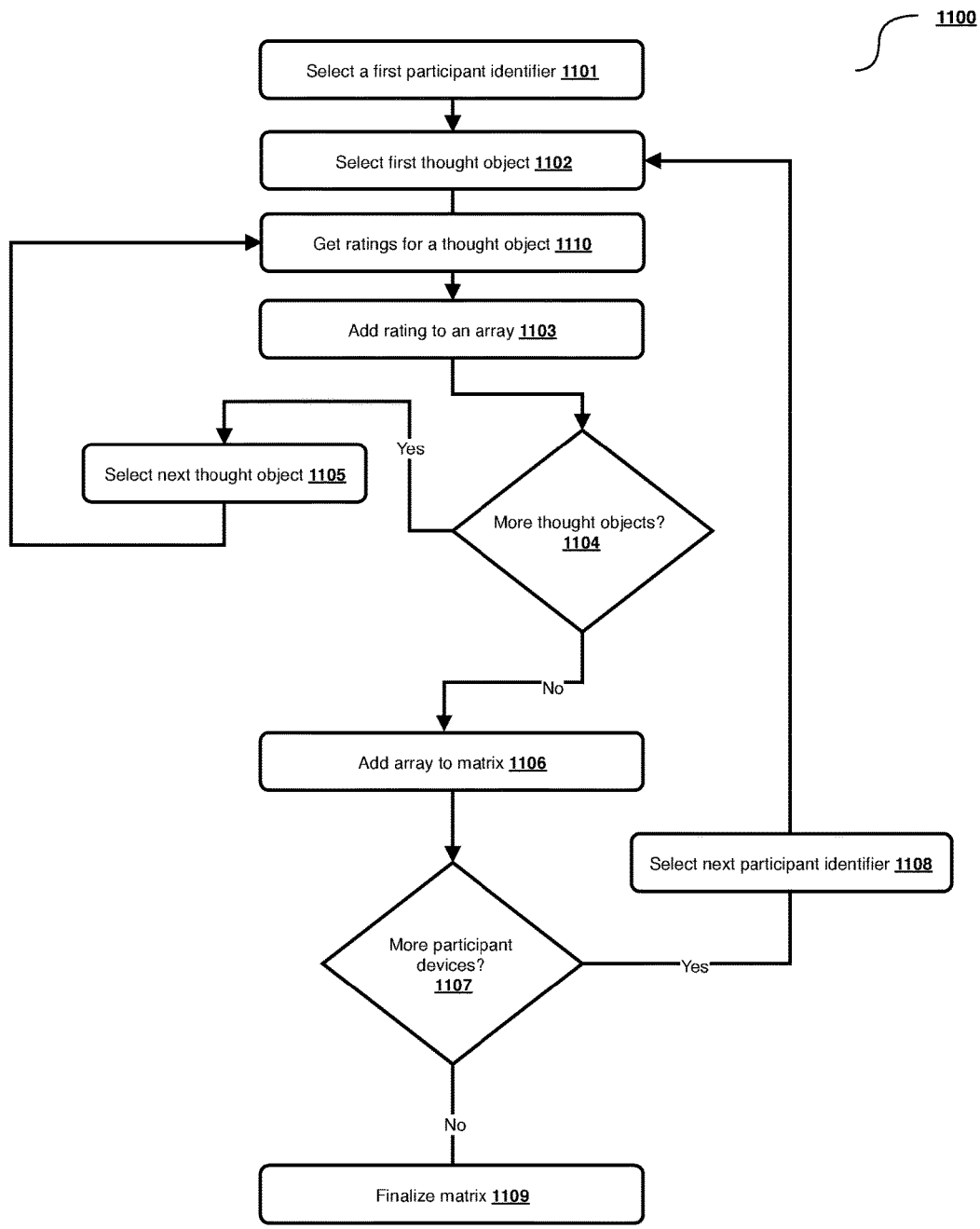
FIG. 10 is a flow diagram illustrating a method for computing a raw matrix for a plurality of priority value responses associated to a plurality of participant devices, according to a preferred embodiment of the invention.

FIG. 10 is a flow diagram illustrating a method for computing a raw matrix for a plurality of priority value responses associated to a plurality of participant devices, according to a preferred embodiment of the invention. According to the embodiment, in a first step 1101, a first participant object 575 is selected by project controller 701. In a next step 1102, a first thought object 510 is selected by project controller 701. In a next step 1110, a rating (i.e. a priority value, for example, a value on a Likert scale of 1 to 5) is retrieved for the selected participant object 575 associated to the selected thought object 510. In a next step 1103, the rating may be added to an array by matrix calculator 703. In a next step 1104, project controller 701 may determine if there are any more thought objects 510 for which a rating may have been received from the first participant object 575. If so a next thought object 510 is selected, in step 1105, by project controller 701, and processing returns to step 1110. Referring again to step 1104, if there are no more rated thought objects 510 associated to the current participant object 575, then the array is added to matrix 901 (referring to FIG. 8) in step 1106. In a next step 1107, project controller 701 may determine if there are any more participant objects 575 left to process, if so, project controller 701 selects the next participant object 575, in step 1108, and processing returns to step 1102. Referring again to step 1107, if project controller 701 determines that there are no more participant objects left to process, then matrix calculator 703 finalizes matrix 901.

Figure 11:
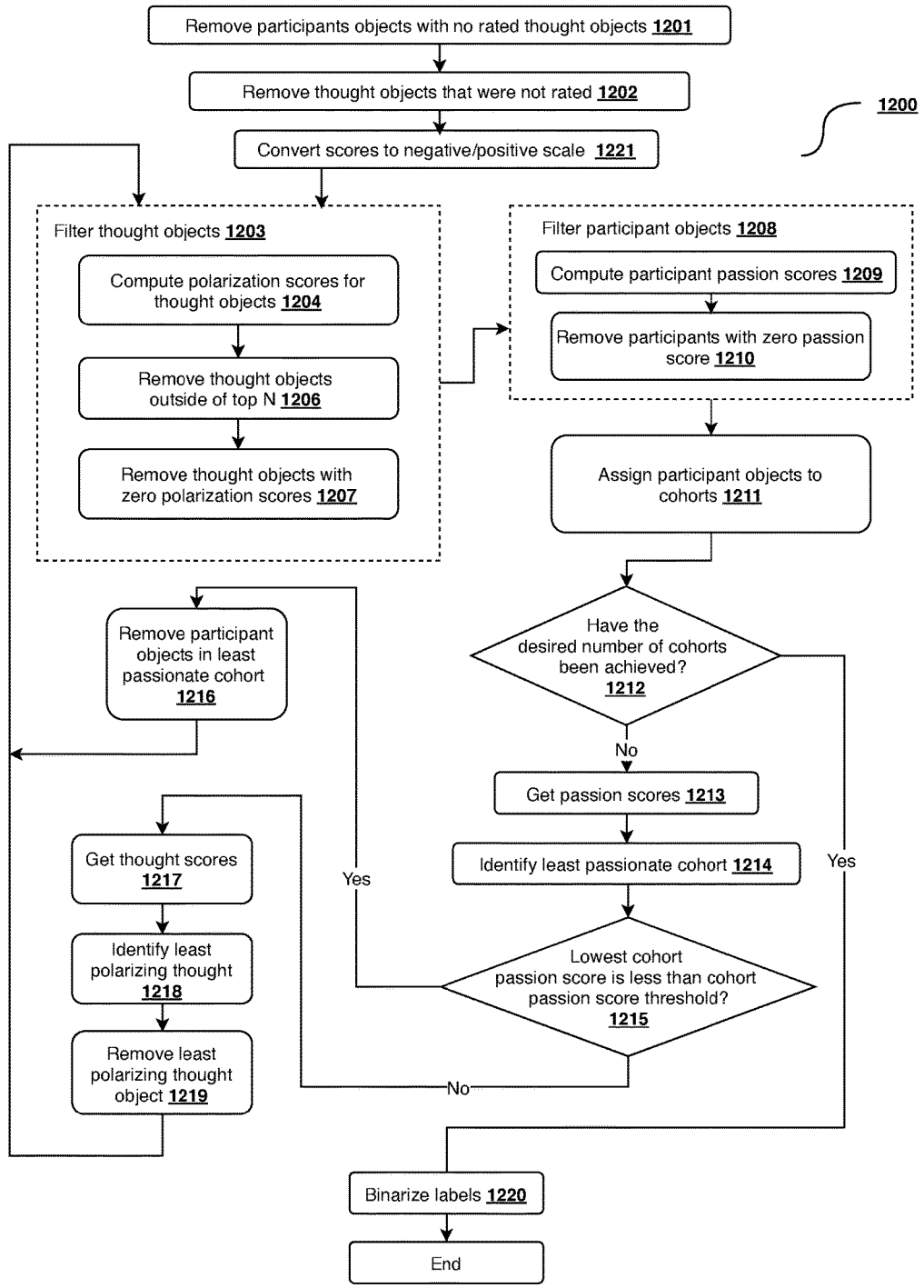
FIG. 11 is a flow diagram illustrating a method for merging participant objects into cohorts based on similar priority value response patterns using a strict association level, according to a preferred embodiment of the invention.

FIG. 11 is a flow diagram illustrating a method for merging participant objects into cohorts based on similar priority value response patterns using a strict association level, according to a preferred embodiment of the invention. According to the embodiment, a method for finding a plurality of thought objects 510 that represent a most polarized collection of priority value responses from a plurality of participant devices 720 is shown (that is, a plurality of thought objects 510 that show priority value response patterns representing an arrangement whereby groupings of participant devices 720 show alignment in an opposite fashion from another group of participant devices 720, for example, submatrix 910, whereby the participant objects 575 may be interpreted as two cohorts whereby the first cohort responded, in terms of the assignment of priority values to thought objects 510, in an opposite fashion as a second cohort). In a preferred embodiment, method 1200 results in two cohorts. In a first step 1201, matrix calculator 702 may remove participant objects 575 whereby no priority values were received from an associated user device 720. In a next step 1202, matrix calculator 702 may remove thought objects 510 that do not have any priority values assigned (that is, no priority values were received for the respective thought object 510 from any participant device). In a next step 1221, priority values may be shifted to a magnitude scale (such as, a negative/positive scale) centered around a zero value, for example, on a five-point Likert scale of 1 to 5, 3 may be subtracted from priority values such that each priority value will fall into a scale −2, −1, 0, +1, and +2, whereby the ends of the scale, for example, −2 and +2, represent a polarity, or an "interest" level for the associated thought object 510 at different ends of an interest spectrum. Furthermore, a priority value of 0 may represent a zero, or no interest, for the associated thought object 510. Said differently, in some embodiments, a priority value of −2 would represent a strong negative interest, a priority value of +2 would represent a strong positive interest to a given thought object 510 by the assigning participant object 575. It should be appreciated by one with ordinary skill in the art that by converting a Likert scale to a magnitude scale improves (or enables) computations of values associated with priority values ratings (i.e. ratings). In a next plurality of steps 1203, thought objects 510 are filtered by polarization scores associated to thought objects 510. In a first filtering step 1204, a polarization score may be calculated, by score calculator 705, for each thought object 510, indicating how polarizing the thought may be. In a next filtering step 1206, a portion of less polarizing thought objects 510 may be removed. For example, in some embodiments, the plurality of thought objects 510 may be sorted by polarization score, from high to low, and those that are outside of the top N more polarizing thought objects in the sorted list may be removed, whereby N may be a preconfigured number. In some embodiments N may be a proportion to the dataset size or may be dynamically calculated based on the number of thought objects 510. In some embodiments, a value for N may be configured to optimize system performance. For example, a project, as defined by project object 539 may start with an associated one thousand thought objects 510, in this example, N may be set to 50 and use the 50 most polarizing thought objects 510 for processing. In some embodiments, removal is performed by setting the polarization score for the thought object to zero, so that it is removed in filtering step 1207. In a next filtering step 1207, thought objects 510 that have a polarization score of zero are removed. It can be appreciated that thought objects 510 having a polarization score of zero are not polarizing, that is, a polarization score of zero represents a neutral (i.e. not for or against) interest for the associated arrangement of information of the associated thought objects 510.

In a next plurality of steps 1208, participant objects are filtered by polarization scores associated to participant objects 575. In a first filtering step 1209, a passion score may be calculated, by score calculator 705, for each participant object 575, for the remaining thought objects 510, indicating how passionate a participant is, which may, in some embodiments, be equal to the sum of the absolute value of the priority values (shifted to a magnitude scale centered around a zero value) assigned by the participant object 575. In a next filtering step 1210, participant objects 575 that have a passion score of zero are removed. It should be appreciated that participant objects having a passion score of zero are not passionate, that is, a passion score of zero represents a neutral (i.e. not for or against) interest for the associated arrangement of information of the associated participant objects 575.

In a next step 1211, participants may be merged into cohorts based on agreement. In some embodiments if two participant objects 575 compared by pattern analyzer 704 assigned priority values of the same sign (that is, a positive priority value, i.e. +1 or +2 on the adjusted five-point scale, versus a negative priority value, i.e. −1 or −2 on the adjusted five-point scale) to all remaining thought objects 510 to which both participants objects 575 assigned priority values other than 0 (on the adjusted five-point scale), the compared participants objects 575 may be merged into the same cohort (for example, merged into cohort A 913), that is, they are in agreement. In a preferred embodiment, a method for merging participants is described in step 1211 beginning at step 1301 (referring to FIG. 12).

In a next step 1212, matrix calculator 703 may determine if a desired number of cohorts has been achieved. In a preferred embodiment, a desired number of cohorts may be two cohorts (for example, resembling submatrix 910) such that the plurality of processed participant objects 575 have been assigned to one cohort or the other (or removed). In some embodiments, more than two cohorts may be desired. If the desired number of cohorts has not been achieved in 1212, in a next step 1213, a passion score may be calculated, by score calculator 705, for each of the cohorts, and the weakest cohort, i.e. the cohort with the lowest passion score, is identified by pattern analyzer 704 in step 1214. In a next step 1215, the lowest cohort passion score is compared to a predefined cohort passion score threshold, by pattern analyzer 704. Accordingly, if the lowest cohort passion score is less than the cohort passion score threshold, then matrix calculator 703 may remove the weakest cohort, i.e. the cohort with the lowest passion score, at step 1216, to remove associated participant objects 575 from consideration in future iterations. After step 1216, method 1200 returns to step 1203.

Referring again to step 1215, if the lowest cohort passion score is greater than or equal to the cohort passion score threshold, then in a next step 1217, a polarization score may be calculated, by score calculator 705, for each of the remaining thought objects 510, and the least polarizing thought, i.e. the thought with the lowest polarization score, is identified by pattern analyzer 704 in step 1218. The matrix calculator 703 may remove the least polarizing thought, i.e. the thought with the lowest polarization score, at step 1219. It should be appreciated that removal of thought objects 510 and/or participant objects 575 may, in some embodiments, be performed by the assignment of zero values to the corresponding thought objects (or participant objects) to be removed, such that in any future iteration (though masking or indexing) the affected objects would not be considered in computations. After step 1219, method 1200 returns to step 1203.

Referring again to step 1212, if the desired number of cohorts has been reached then labels for the two remaining cohorts are binarized in step 1220. If there is only one set of thought objects (as shown in submatrix 910 in FIG. 8) the thought objects 510 are labeled +1, the cohorted participant objects 575 that gave those thought objects 510 positive priority values, are labeled +1 and cohorted participant objects 575 that provided thought objects 510 negative priority values are labeled −1. If two sets of thought objects 510 remain (as shown in submatrix 920 in FIG. 8), then a first set of thought objects 510 is labeled +1 and the second is labeled −1. Cohorted participant objects 575 that are associated to positive priority values provided to thought objects 510 labeled +1 and associated to negative priority values provided to thought objects 510 labeled −1 are labeled +1. Cohorted participant objects 575 that are associated to negative priority values provided to thought objects labeled +1 and associated to positive priority values provided to thoughts labeled −1 are labeled −1. Once the labels are binarized, method 1200 ends.

Figure 12:
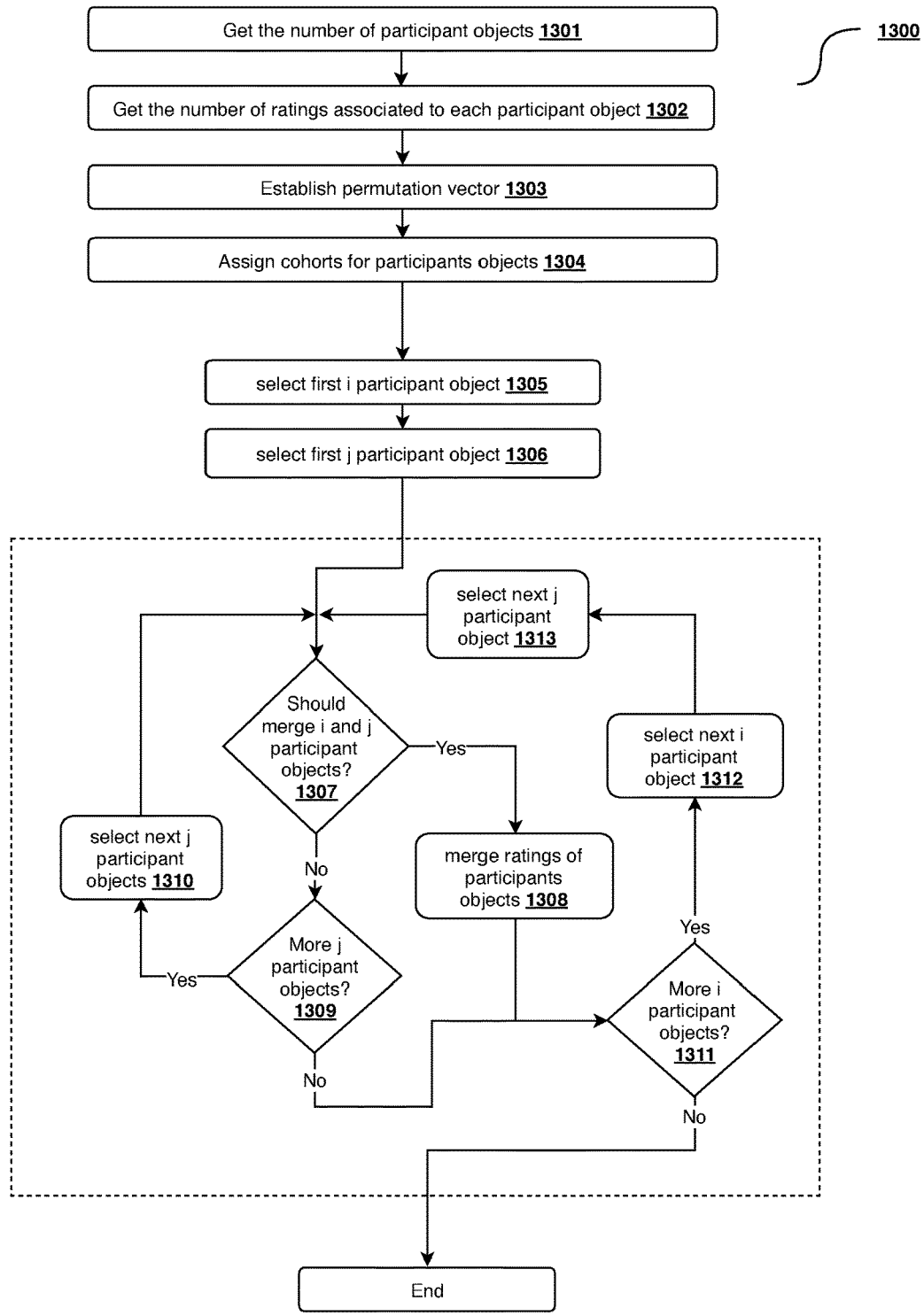
FIG. 12 is a flow diagram illustrating a method for an iterative comparison of participant objects for cohort assignment, according to a preferred embodiment of the invention.

FIG. 12 is a flow diagram illustrating a method for an iterative comparison of participant objects for cohort assignment, according to a preferred embodiment of the invention. It should be appreciated that at an initial execution of the method by the processor, each participant object 575 may be initialized as their own cohort (that is, as an initial configuration for computation, each cohort may comprise one participant object 575). As the method iterates and participant objects 575 are analyzed, for participant objects showing similar response patterns, those participant objects 575 may be merged into a single cohort, therefore a cohort, as the system iterates, may comprise (or refer) to a plurality of participant objects 575. According to the embodiment, in a first step 1301, a quantity of participant objects 575 is calculated. In a next step 1302, a quantity of priority values received (i.e. the quantity of ratings assigned) by each participant device, as indicated by an associated participant object 575, is received at project controller 702. In a next step 1303, a permutation vector is established for the plurality of participant objects 575 with a length equaling the number of participant devices 720 (i.e. participant objects 575 determined in step 1302) that assigned priority values to one or more thought objects 510 in the group of related thought objects 510, for example, in an embodiment where there are nine participant devices 720 that responded to a group of related thought objects 510, an initial permutation vector may resemble the following:

Participant permutation vector=[$P_1$, $P_2$, $P_3$, $P_4$, $P_5$, $P_6$, $P_7$, $P_8$, $P_9$]

Wherein each element of the vector represents a participant object 575. In a preferred embodiment, the permutation vector is ordered by the number of thoughts (i.e. quantity) rated by the plurality of participant objects 575 in descending order, that is, the participant object is the first position, e.g. $P_1$, assigned the most quantity of priority values to the plurality of related thought objects 510 (as calculated in step 1302). In a next step 1304, a cohort number may be assigned to each participant, for example:

Cohort permutation vector=[1, 2, 3, 4, 5, 6, 7, 8, 9]

Wherein each cohort label may be, for example, indicated by the number within the permutation vector for the corresponding index location of the participant permutation vector. It should be appreciated that at this stage of the cohort assignment, each participant has been assigned to their own cohort. In a next step 1305, a first participant object 575 (for example, $P_1$) is selected, by score calculator 705, for comparison to other participants objects 575. In a next step 1306, a second participant object 575 is selected (for example, $P_2$). In a next step, the first participant object 575 is compared, by pattern analyzer 704, to the second participant object 575, in step 1307, to determine if the two participants are matched, for example, in terms of similarity of patterns of priority values assigned to thought objects 510. If pattern analyzer determines that there is a match, the cohort permutation vector for the first participant object 575 is overwritten, in step 1308, with the cohort label of the second participant object 575 (see exemplary cohort permutation vector below) and the rating values of the first participant are added to the ratings of the second participant. It should be appreciated that, after this merge event, the second participant is now representative of a cohort that includes the first participant as well as itself. If pattern analyzer 704 determines that there is no match, a check is made to see if more second participant objects 575 exist for comparison in step 1309, if so, a next participant object 575 (that is, a new second participant object 575) is selected (for example, $P_3$), by pattern analyzer 704, and processing returns to step 1307, to determine if the new pair should be merged, otherwise, if there are no more second participant objects 575 to process (referring again to step 1309), then processing continues at step 1311 described below). Referring again to step 1308, processing continues in a next step 1311 project controller 702 checks for a next first participant object 575 by moving along the vector to the next participant object in the participant permutation vector. If there are one or more participant objects 575 left to process, a next first participant object 575 (for example, $P_2$) is selected, by score calculator 705 in step 1312, for comparison to other participants objects 575. In a next step 1313, a new second participant object 575 is selected (for example, $P_3$), and processing returns to step 1307 to determine if there is a match. Referring again to step 1311, if there are no new first participant objects 575, the processing ends. It should be appreciated that, in some embodiments, participant/cohorts are merged (or matched) if the plurality of participant objects 575 that are compared (that is, a participant object 575 compared to another participant object 575 or compared to a cohort of participant objects 575) assigned compatible priority values to all thought objects 510 they both rated, wherein compatible, refers to the priority values are the same sign or zero. In other words, using a zero-centered scale, priority values that are compared are compatible if they are both negative, or both positive, or either rating is zero. Once an agreement condition is present, the resulting priority values are summed together.

In an exemplary embodiment, a cohort permutation vector where $P_3$ and $P_6$ were determined to be in the same cohort (using the method described above) and $P_4$ and $P_9$ were determined to be in the same cohort (though different than the $P_3/P_6$ cohort), a cohort permutation vector may be labeled, by method 1300, as follows:

Cohort permutation vector=[1,2,6,9,5,6,7,8,9]

One with skill in the art can see that there are two participant objects that belong to cohort 6 (i.e. $P_3$ and $P_6$) and there are two members that belong to cohort 9 (i.e. $P_4$ and $P_9$). The remaining cohort labels show that cohorts 1, 2, 5, 7, and 8 have only one participant 575 object member, specifically, $P_1$, $P_2$, $P_5$, $P_7$, and $P_8$.

Said differently, a method for computing a submatrix using a strict association level comprising the steps of the matrix calculator removing participant objects of the plurality of participant objects, that have no associated priority values, then the matrix calculator removing thought objects that have no associated priority values, then the matrix calculator converting priority values into a range centered around zero value, then a score calculator calculating a polarization score for each thought object, then the matrix calculator filtering at least a portion of the thought objects based on an associated polarization score, then the score calculator computing a passion score for each participant object, then the matrix calculator filtering at least a portion of the plurality of participant objects based on an associated passion score, then the matrix calculator assigning each participant object to its own cohort, then a pattern analyzer selecting a first cohort of the plurality of cohorts, then the pattern analyzer iteratively comparing a plurality of assigned priority value responses associated to the first cohort of the plurality of cohorts, to each plurality of assigned priority value responses associated to each remaining cohort of the plurality of cohorts, to determine an agreement whereby if there is agreement, merging the first cohort with the second cohort, then the pattern analyzer selecting a next cohort and repeating, then repeating the iteration step for all cohorts.

Figure 13:
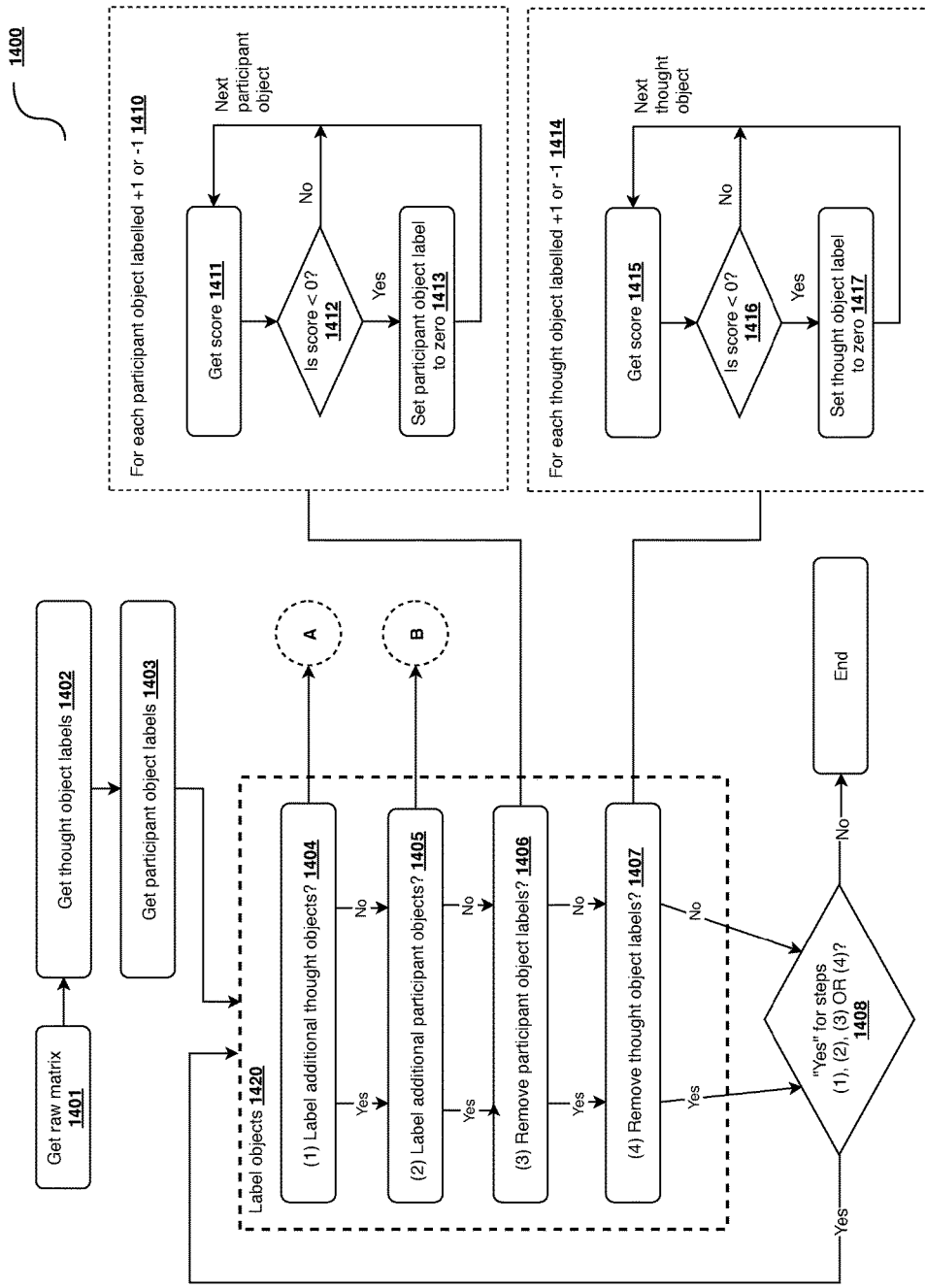
FIG. 13 is a flow diagram illustrating a method for tolerant merging of additional participant and thought objects into currently labeled cohorts based on similar priority value response patterns, according to a preferred embodiment of the invention.

FIG. 13 is a flow diagram illustrating a method for tolerant merging of additional participant and thought objects into currently labeled thought/participant cohorts (labels 521 and 522) based on similar priority value response patterns, according to a preferred embodiment of the invention. According to the embodiment, participant objects 575 may be merged (i.e. grouped), by matrix calculator 703, with a tolerant association level (that is, a similarity of patterns that are somewhat similar or tolerant in similarity in order to merge), for example, into an arrangement whereby similar priority value patterns are associated by a cohort identifier. Accordingly, in a first step 1401, a raw matrix is received (for example, as described in FIG. 7). In a next step 1402, binarized labels 521 of thought objects 510 are received (for example as resultant from step 1220 referring to FIG. 11). In a next step 1403, binarized labels 522 of participant objects 575 are received (for example as resultant from step 1220 referring to FIG. 11). In a next series of steps 1420, matrix calculator 703 may determine if: (1) additional thought objects may be labeled in step 1404 (according to the method described in FIGS. 14-15), (2) additional participant objects may be labeled in step 1405 (according to the method described in FIGS. 16-17), (3) if participant objects labels should be removed in step 1406 and (4) if thought objects labels should be removed in step 1407. It should be noted that steps 1404, 1405, 1406, and 1407 may happen in any order.

Referring to 1406 a process for removing participant objects 575 may analyze each participant object 575 for its binary label in a series of steps 1410, wherein for each participant object with a binary label 522 (for example, +1 or −1), a participant-cohort compatibility score may be calculated by score calculator 705 in step 1411.

In a next step 1412, if the participant-cohort compatibility score is less than a preconfigured threshold (for example, zero) then a label 522 associated to the instant participant object 575 is set to zero in step 1413. It should be appreciated that a participant-cohort compatibility score is a measure of how closely a participant object fits within a cohort, for example, based on a similarity of patterns of priority values assigned to one or more thought objects 510 by the instant participant object and the cohort as a whole.

Referring to 1407, a process for removing at least a portion of thought objects 510 comprises a series of steps 1414. Accordingly, in step 1415, for each thought object 510 with a binary label 521 (for example, +1 or −1), a thought-cohort compatibility score may be calculated by score calculator 705.

In a next step 1416, if the thought-cohort compatibility score is less than a preconfigured threshold (for example, zero) then label 521 associated to the instant thought object 510 is set to zero in step 1417. It should be appreciated that a thought-cohort compatibility score is a measure of how closely a thought object fits within a cohort, for example, based on a similarity of patterns of priority values assigned by one or more participant objects 575 to the instant thought object and the cohort as a whole.

Referring now to step 1408, if steps 1404, 1405, 1406, and/or 1407 resulted in yes, then processing returns to step 1404 where the series of steps 1420 begins again. Otherwise, if each step 1404, 1405, 1406, and/or 1407 resulted in no, processing ends.

Figure 14:
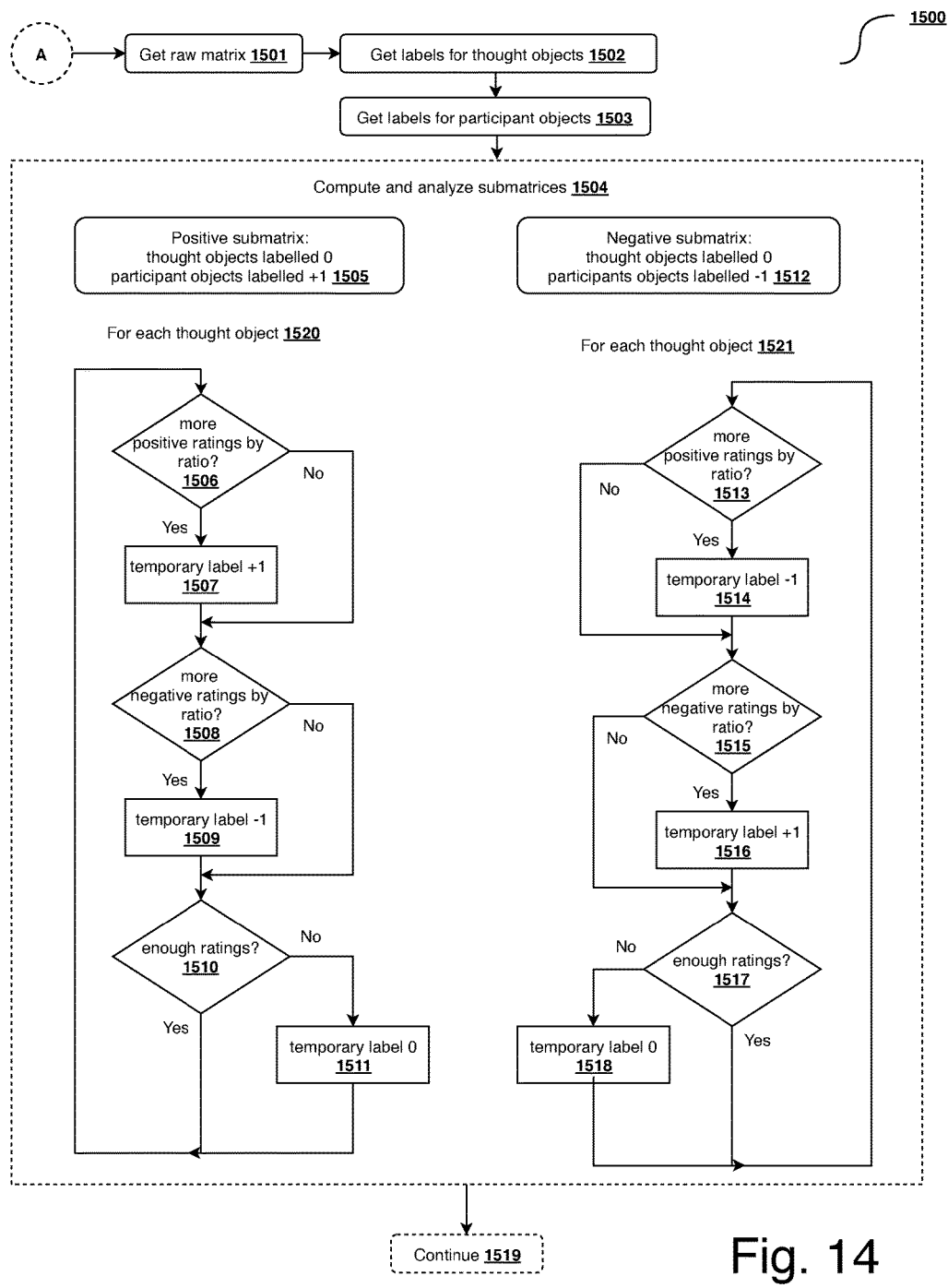
FIG. 14 is a flow diagram illustrating a method for assigning computation labels for a plurality of thought objects associated to a plurality of interest-based submatrices, according to a preferred embodiment of the invention.

FIG. 14 is a flow diagram illustrating a method for assigning computation labels 521 to a plurality of thought objects associated to a plurality of interest-based submatrices, according to a preferred embodiment of the invention. According to the embodiment, in a first step 1501, a raw matrix is received (for example, as described in FIG. 7) by matrix calculator 703. In a next step 1502, binarized labels 521 of thought objects 510 are received (for example as resultant from step 1220 referring to FIG. 11) by matrix calculator 703. In a next step 1403, binarized labels 522 of participant objects 575 are received (for example as resultant from step 1220 referring to FIG. 11). In a next series of steps 1504, submatrices are computed and analyzed by pattern analyzer 704 for possible addition to cohorts at a tolerant association level. Accordingly, in a first step 1505, a positive submatrix is calculated to include thought objects with a thought cohort label 521 of 0 and participant objects with a participant cohort label 522 of +1. It should be appreciated that a submatrix may be calculated such that the addressable matrix elements described above may be achieved by using masking and indexing techniques known in the art. Accordingly, in a series of steps 1520, for each thought object within the positive submatrix a process to create a temporary thought cohort label 521 is performed, in order to be compared with a corresponding temporary cohort label from the negative submatrix in step 1602. Step 1506 begins by determining, by pattern analyzer 704, if there are more positive priority values based on a pre-defined ratio (for example, a ratio of 3) as compared to negative priority values for the instant thought object 510. For example, if there are a quantity of ten positive priority values received for the instant thought object 510 and ten negative priority values received for the same thought object 510, with a pre-defined ratio of three, the threshold will not be exceeded, and processing may continue at step 1508. In a further example, if there are ten positive priority values received and three negative priority values received, then the threshold is passed, and processing continues at step 1507 and the thought object is given a temporary label of +1. In a next step 1508, conversely, pattern analyzer 704 analyzes negative priority values by a ratio to determine if there are more negative priority values based on a pre-defined ratio (for example, a ratio of 3) as compared to negative priority values, in step 1509, for the instant thought object 510. For example, if there are a quantity of ten negative priority values received for the instant thought object 510 and ten positive priority values received for the same thought object 510, with a pre-defined ratio of three, the threshold will not be exceeded, and processing may continue at step 1510. In a further example, if there are ten negative priority values received and three positive priority values received, then the threshold has passed, and processing may continue at step 1509 and the thought object is given a temporary label of −1. It can be appreciated that for the positive matrix, process 1520 is looking for more positive priority values from the positive group in order to include them into the positive group. In a next step 1510, pattern analyzer 704 checks if there are enough priority values received in step 1510 based on a predefined threshold, for example as calculated or received by threshold calculator 706. If there are not enough, then the instant thought object is given a temporary label of zero in step 1511.

In a similar set of steps, step 1512, a negative submatrix is calculated to include thought objects with cohort labels 521 of 0 and participant objects with cohort labels 522 of −1. It should be appreciated that a submatrix may be calculated such that the addressable matrix elements described above may be achieved by using masking and indexing techniques known in the art. Accordingly, in a series of steps 1521, for each thought object 510 within the negative submatrix, a process to create a temporary thought cohort label 521 is performed, in order to be compared with a corresponding temporary cohort label from the positive submatrix in step 1602. Step 1513 begins by determining, by pattern analyzer 704, if there are more positive priority values received based on a pre-defined ratio (for example, a ratio of 3) as compared to negative priority values received for the instant thought object 510. For example, if there are a quantity of ten positive priority values for the instant thought object 510 and ten negative priority values for the same thought object 510, with a pre-defined ratio of three, the threshold will not be exceeded, and processing may continue at step 1515. In a further example, if there are ten positive priority values and three negative priority values, then the threshold has passed, and processing may continue at step 1514 and the instant thought object is given a temporary label of −1. Conversely, in a next step 1515, pattern analyzer 704 analyzes negative priority values by ratio to determine if there are more negative priority values, in step 1515, based on a pre-defined ratio (for example, a ratio of three) as compared to negative priority values for the instant thought object 510.

For example, if there are a quantity of ten negative priority values for the instant thought object 510 and ten positive priority values for the same thought object 510, with a pre-defined ratio of three, the threshold will not be exceeded, and processing may continue at step 1517. In a further example, if there are ten negative priority values and three positive priority values, then the threshold has passed, and processing may continue at step 1516 and the instant thought object is given a temporary label of +1. It can be appreciated that for the negative matrix, process 1521 is looking for more positive priority values from the negative group in order to include them into the negative group. In a next step 1517, threshold calculator 706 determines if there are enough priority values in step 1517. If there are not enough, then the instant thought object is given a temporary label of zero in step 1518. The process continues in step 1519 to FIG. 15. The goal is to determine if a cohorted group of participant devices 720 has uniquely rated a thought according to their patterns in order for the thought to be labeled to the same cohort.

Figure 15:
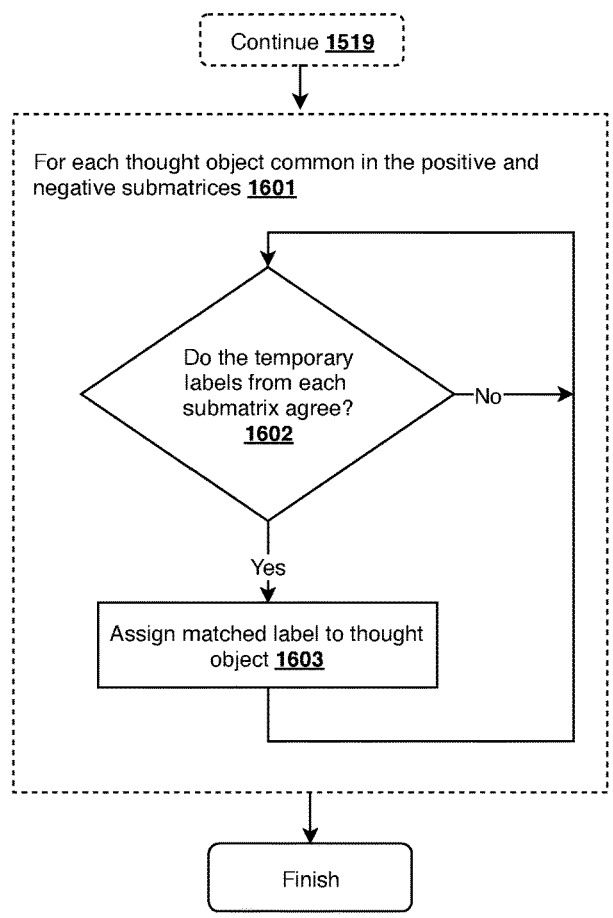
FIG. 15 is a flow diagram continuing from FIG. 14 illustrating a method for assigning computation labels for a plurality of thought objects associated to a plurality of interest-based submatrices, according to a preferred embodiment of the invention.

FIG. 15 is a flow diagram continuing from FIG. 14 illustrating a method for assigning computation labels 521 to a plurality of thought objects associated to a plurality of interest-based submatrices, according to a preferred embodiment of the invention. According to the embodiment, in a first series of steps 1601, each thought object 510 common in both the positive and negative submatrices, is selected, by matrix calculator 703 to see if the temporary labels assigned to the thought object in 1500, from each of the matrices agree in step 1602. If not, the next thought object is selected. If so, the matched label is assigned to the thought object, in step 1603, as a 521 label. Once all thought objects 510 labeled zero have been processed, process 1600 ends.

An exemplary table for calculating a final label may be as follows:

| Temporary Positive Submatrix label | Temporary Negative submatrix label | Agree? | Final 521 Label |
|---|---|---|---|
| +1 | +1 | T | +1 |
| +1 | 0 | F | n/a |
| +1 | −1 | F | n/a |
| 0 | +1 | F | n/a |
| 0 | 0 | T | 0 |
| 0 | −1 | F | n/a |
| −1 | +1 | F | n/a |
| −1 | 0 | F | n/a |
| −1 | −1 | T | −1 |

Figure 16:
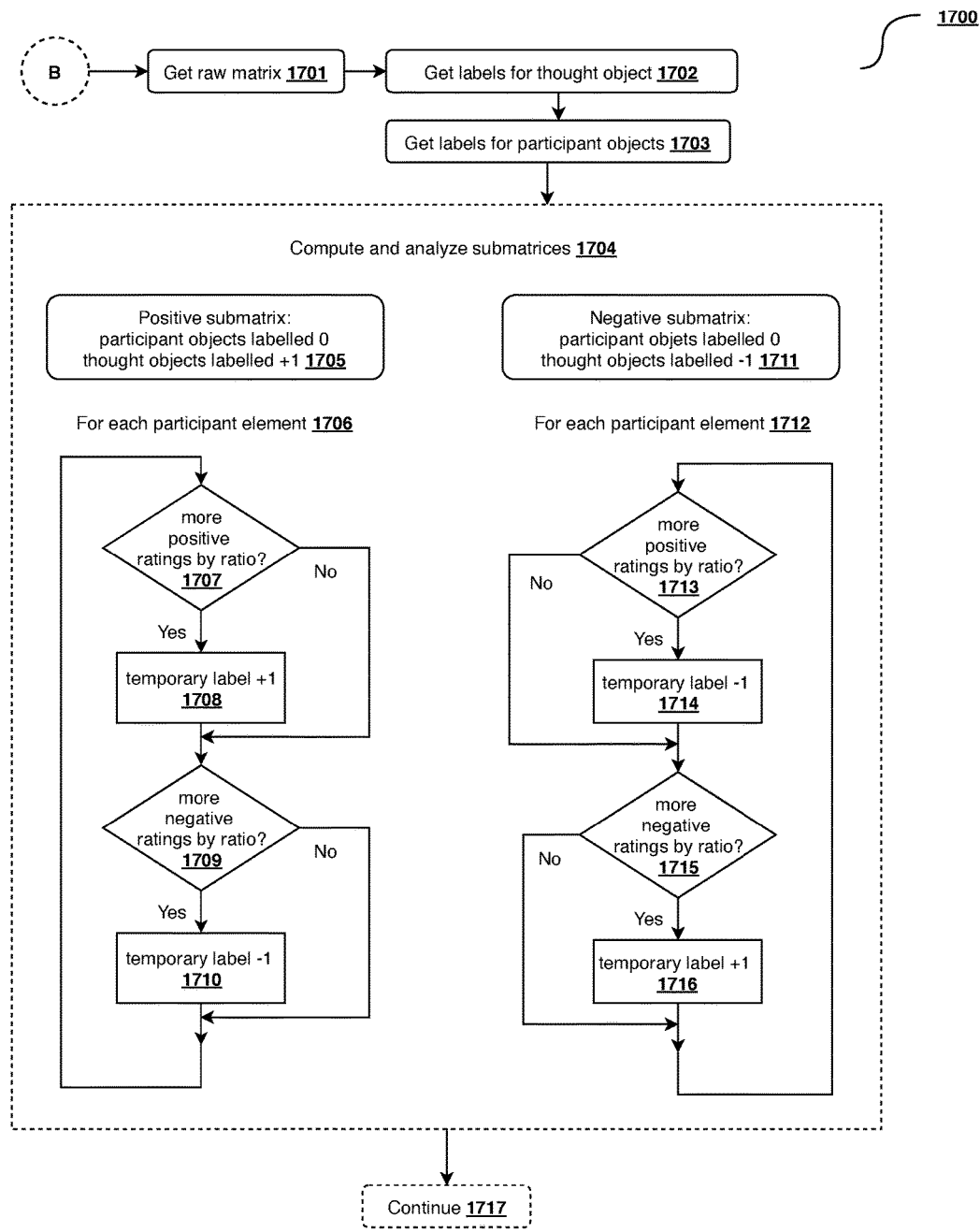
FIG. 16 is a flow diagram illustrating a method for assigning computation labels for a plurality of participant objects associated to a plurality of interest-based submatrices, according to a preferred embodiment of the invention.

FIG. 16 is a flow diagram illustrating a method for assigning computation labels 522 to a plurality of participant objects associated to a plurality of interest-based submatrices, according to a preferred embodiment of the invention. According to the embodiment, in a first step 1701, a raw matrix is received (for example, as described in FIG. 7). In a next step 1702, binarized labels 521 of thought objects 510 are received (for example as resultant from step 1220 referring to FIG. 11) by matrix calculator 703. In a next step 1703, binarized labels 522 of participant objects 575 are received (for example as resultant from step 1220 referring to FIG. 11) by matrix calculator 703. In a next series of steps 1704, submatrices are computed and analyzed by pattern analyzer 704 for possible addition to cohorts at a tolerant association level. Accordingly, in a first step 1705, a positive submatrix is calculated to include participant objects with 522 labels of 0 and thought objects with 521 labels of +1. It should be appreciated that a submatrix may be calculated such that the addressable matrix elements described above may be achieved by using masking and indexing techniques known in the art. Accordingly, in a series of steps 1706, for each participant object 575 within the positive submatrix, a process to create a temporary participant cohort label 522 is performed, in order to be compared with a corresponding temporary cohort label from the negative submatrix in step 1802. Step 1707 begins by determining, by pattern analyzer 704, if there are more positive priority values based on a pre-defined ratio (for example, a ratio of three) as compared to negative priority values for the instant participant object 575. For example, if there are a quantity of ten positive priority values for the instant participant object 575 and ten negative priority values for the same participant object 575, with a pre-defined ratio of three, the threshold will not be exceeded, and processing may continue at step 1709. In a further example, if there are ten positive priority values and three negative priority values, then the threshold is passed, and processing may continue at step 1708 and the instant participant object is given a temporary label of +1. Conversely, in a next step 1709, pattern analyzer 704 analyzes negative priority values by ratio to determine if there are more negative priority values based on the pre-defined ratio (for example, a ratio of three) as compared to negative priority values for the instant participant object 575. For example, if there are a quantity of ten negative priority values for the instant participant object 575 and ten positive priority values for the same participant object 575 with a pre-defined ratio of three, the threshold will not be exceeded, and processing may return to step 1707. In a further example, if there are ten negative priority values and three positive priority values, then the threshold has passed, and processing may continue at step 1710 and the instant participant object is given a temporary label of −1. The method returns to step 1707. It can be appreciated that for the positive matrix, process 1706 is looking for more positive priority values to the positive thoughts in order to include the unlabeled participant object 575 into the positive group.

In a next step 1711, a negative submatrix is calculated to include participant objects with 522 labels of 0 and thought objects with 521 labels of −1. It should be appreciated that a submatrix may be calculated such that the addressable matrix elements described above may be accessed by using masking and indexing techniques known in the art. Accordingly, in a series of steps 1712, for each participant object 575 within the negative submatrix, a process to create a temporary participant cohort label 522 is performed, in order to be compared with a corresponding temporary cohort label from the positive submatrix in step 1802. Step 1713 begins by determining, by pattern analyzer 704, if there are more positive priority values based on a pre-defined ratio (for example, a ratio of three) as compared to negative priority values for the instant participant object 575. For example, if there are a quantity of ten positive priority values for the instant participant object 575 and ten negative priority values for the same participant object 575, with a pre-defined ratio of three, the threshold will not be exceeded, and processing may continue at step 1715. In a further example, if there are ten positive priority values and three negative priority values, then the threshold is passed, and processing may continue at step 1714 and the instant participant object is given a temporary label of −1. Conversely, in a next step 1715, pattern analyzer 704 analyzes negative priority values by ratio to determine if there are more negative priority values based on a pre-defined ratio (for example, a ratio of three) as compared to positive priority values for the instant thought object 510. For example, if there are a quantity of ten negative priority values for the instant thought object 510 and ten positive priority values for the same thought object 510, with a pre-defined ratio of three, the threshold will not be exceeded, and processing may return to step 1713. In a further example, if there are ten negative priority values and three positive priority values, then the threshold has passed, and processing may continue at step 1716 and the instant participant object is given a temporary label of +1. In a next step the method returns to step 1713 and the process begins again for the next participant object 575. It can be appreciated that for the negative matrix, process 1712 is looking for more positive priority values from the negative group in order to include them into the negative group. Once computation and analysis of submatrices 1704 is complete, processing continues at step 1717 to FIG. 17.

Figure 17:
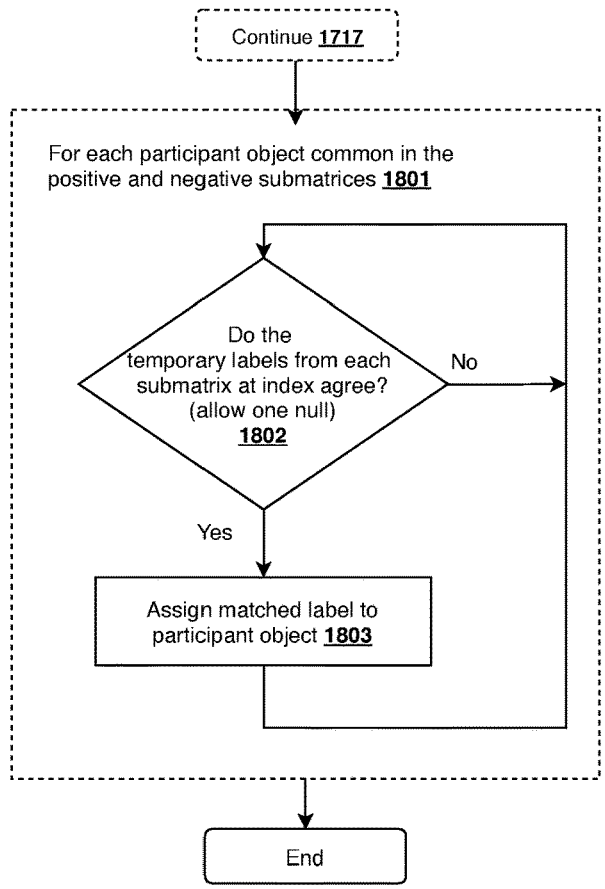
FIG. 17 is a flow diagram continuing form FIG. 16 illustrating a method for assigning computation labels for a plurality of participant objects associated to a plurality of interest-based submatrices, according to a preferred embodiment of the invention.

FIG. 17 is a flow diagram continuing form FIG. 16 illustrating a method for assigning computation labels 522 to a plurality of participant objects associated to a plurality of interest-based submatrices, according to a preferred embodiment of the invention. According to the embodiment, in a first series of steps 1801, each participant object common in both the positive and negative submatrices, is selected, by matrix calculator 703 to see if the temporary labels assigned to the participant object in 1700, from each of the matrices agree in step. If not, the next participant object is selected. If so, the matched element label is assigned to the participant, in step 1803, as a 522 label.

An exemplary table for calculating a final label may be as follows:

| Temporary Positive Submatrix label | Temporary Negative submatrix label | Agree? | Final 522 Label |
|---|---|---|---|
| +1 | +1 | T | +1 |
| +1 | 0 | F | n/a |
| +1 | −1 | F | n/a |
| +1 | null | T | +1 |
| 0 | +1 | F | n/a |
| 0 | 0 | T | 0 |
| 0 | −1 | F | n/a |
| 0 | null | T | 0 |
| −1 | +1 | F | n/a |
| −1 | 0 | F | n/a |
| −1 | −1 | T | −1 |
| −1 | null | T | −1 |
| null | +1 | T | +1 |
| null | 0 | T | 0 |
| null | −1 | T | −1 |
| null | null | F | n/a |

Null values are accounted for within the positive and negative submatrices for scenarios such as in submatrix 910 (referring to FIG. 8) where only one set of thought objects exist with one of the binarized labels, rendering one of the submatrices empty and nullified.

The skilled person will be aware of a range of possible modifications of the various embodiments described above. Accordingly, the present invention is defined by the claims and their equivalents.

What is claimed is:

1. A system for clustering interest for a plurality of participant objects and a plurality of thought objects based on priority values comprising:
   a network-connected interest clustering computer comprising a processor, a memory, and programming instructions, the programming instructions, when executed by the processor, cause the processor to cluster interest for a plurality of participant objects and thought objects comprising:
   a device interface;
   a plurality of user devices;
   a project controller;
   a matrix calculator;
   a question object;
   a plurality of participant objects;
   a plurality of thought objects;
   a score calculator;
   a pattern analyzer;
   wherein the device interface receives a plurality of connections from the plurality of user devices on a network;
   wherein the project controller:
      associates each user device to a participant object of the plurality of participant objects;
      receives a question object comprising, at least, an arrangement of information from a first user device of the plurality of user devices;
      sends the question object to at least a portion of the plurality of user devices;
      receives the plurality of thought objects from at least a portion of the user devices;
      sends the plurality of the thought objects to at least a portion of the user devices;
      receives a plurality of priority value responses from a plurality of participant devices, each priority value response associated to a thought object of the plurality of thought objects and to a corresponding participant object of the plurality of participant objects;
   wherein the matrix calculator:
      computes a ratings matrix, the ratings matrix based on the plurality of priority values, the ratings matrix comprised of at least a portion of the plurality of participant devices and at least a portion of the plurality of thought objects;
      permutes the ratings matrix into an interest-based submatrix, the permutation identifying a plurality of cohorts comprising at least a portion of the plurality of participant objects and at least a portion of the plurality of thought objects based on similar patterns of priority value responses;
   wherein the participant devices are comprised from at least a portion of the user devices;
   wherein each priority value fall within a predefined range;
   wherein to compute the submatrix using a strict association level, the matrix calculator is operable to:
      remove participant objects of the plurality of participant objects, that have no associated priority values;
      remove thought objects of the plurality of thought objects, that have no associated priority values;
      convert the plurality of priority values into a range centered around zero value;
      filter at least a portion of the plurality of thought objects based on an associated polarization score, the polarization score calculated by summing the absolute values of the plurality of priority values assigned to an associated thought object and subtracting the absolute value of a sum of the plurality of priority values;
      filter at least a portion of the plurality of participant objects based on an associated passion score, the passion score calculated by summing the absolute values of the plurality of priority values assigned by an associated participant object;
      assign each participant object of the plurality of participant objects to its own cohort of a plurality of cohorts;

wherein the score calculator is operable to:
calculate a polarization score for each thought object of the plurality of thought objects;
calculate a passion score for each participant object of the plurality of participant objects;
wherein the pattern analyzer is operable to compare a plurality of assigned priority value responses associated to a first cohort, to a second plurality of assigned priority value responses associated to a second cohort, to determine an agreement, wherein if there is agreement, merging the first cohort with the second cohort;
wherein the agreement between the first priority value response and the second priority value response is determined by comparing, by the pattern analyzer, the signs associated to the first plurality of assigned priority value responses and the second plurality of assigned priority value responses;
wherein the predefined range is a zero-centered scale;
wherein if two cohorts, the matrix calculator is operable to assign a binarized label to each participant object and to each thought object based on associated priority values;
further wherein if other than two cohorts remain, the score calculator is further operable to calculate a passion score for each remaining cohort;
wherein if the passion score is less than a predefined threshold, matrix calculator is operable to iteratively remove at least a portion of participant objects, the at least portion of participant objects associated to one or more remaining cohorts with the lowest passion score,
wherein if the passion score is greater than the predefined threshold:
the score calculator is further operable to iteratively calculate a polarization score for the at least portion of thought objects;
the matrix calculator is further operable to iteratively remove at least a portion of the plurality of thought objects, the at least portion of the plurality of thought objects associated to one or more thought objects with the lowest polarization score.

2. The system of claim 1, wherein the pattern analyzer is further operable to:
label the at least one thought object, if it is determined that at least one additional thought object, of the plurality of thought objects, should be labeled;
label the at least one participant object, if it is determined, by the pattern analyzer, that at least one additional participant object, of the plurality of participant objects, should be labeled;
remove the at least one thought object, by an assignment of a zero label, if it is determined, by the pattern analyzer, that at least one thought object with a non-zero label, of the plurality of thought objects, should be removed;
remove the at least one participant object, by an assignment of a zero label, if it is determined, by the pattern analyzer, that at least one participant object with a non-zero label, of the plurality of participant objects, should be removed;
wherein if at least one thought object or at least one participant object is labeled or removed iteratively labeling or removing, or both, the at least one thought object or the at least one participant object, or both;
wherein removing the at least one thought object is performed by labeling the at least one thought object as zero;
wherein removing the at least one participant object is performed by labeling the at least one participant object as zero;
wherein the determination to remove the at least one thought object is based on a comparison of patterns of priority values assigned to the at least one thought object by one or more participant objects of the plurality of participant objects, indicating an incompatibility between the label of the at least one thought object, the labels of the one or more participant objects, and the signs of the priority values assigned to the at least one thought object by the one or more participant objects;
wherein the determination to remove the at least one participant object is based on a comparison of patterns of priority values assigned by the at least one participant object to one or more thought objects of the plurality of thought objects, indicating an incompatibility between the label of the at least one participant object, the labels of the one or more thought objects, and the signs of the priority values assigned by the at least one participant object to the one or more thought objects.

3. The system of claim 2, wherein labeling the at least one thought object comprises:
a computation of a positive submatrix from at least a first portion of priority values from the ratings matrix, the at least first portion of priority values associated to a participant object with a positive label and to a thought object of the plurality of thought objects labeled as zero;
an analysis of one or more priority value responses associated to a first thought object from the positive submatrix;
a comparison of the number of positive priority value responses to the number of negative priority value responses;
wherein if the first thought object is associated to more positive priority value responses than negative priority value responses, a positive label to the first thought object is assigned to the first thought object, otherwise a negative label is assigned to the first thought object;
a computation of a negative submatrix from at least a second portion of priority values from the ratings matrix, the at least second portion of priority values associated to a participant object with a negative label and to a thought object of the plurality of thought objects labeled as zero;
an analysis of one or more priority value responses associated to a first thought object from the negative submatrix;
a comparison of the number of positive priority value responses to the number of negative priority value responses;
wherein if the first thought object is associated to more negative priority value responses than negative priority value responses, a negative label is assigned to the first thought object, otherwise a positive label is assigned to the first thought object;
wherein the matrix calculator is operable to iteratively compute, analyze and compare each thought object associated to the positive submatrix;
wherein the matrix calculator is operable to iteratively compute, analyze and compare each thought object associated to the negative submatrix.

4. The system of claim 3, wherein the comparison of the number of positive priority value responses to the number of negative priority value responses is based on a ratio.

5. The system of claim 4, wherein the matrix calculator is further operable to compare a temporary label associated to a common thought object;
  wherein the common thought object is present in both the positive submatrix to the negative submatrix;
  wherein if the temporary label associated to the common thought object in the positive submatrix is the same as the temporary label associated to the common thought object in the negative submatrix, assign the matched temporary label to the label of the common thought object.

6. The system of claim 2, wherein labeling the at least one participant object comprises:
  a computation of a positive submatrix from at least a third portion of priority values from the ratings matrix, the at least third portion associated to a participant object labeled as zero and to a thought object of the plurality of thought objects with a positive label;
  an analysis of one or more priority value responses associated to a first participant object from the positive submatrix;
  a comparison of the number of positive priority value responses to the number of negative priority value responses associated to the first participant object;
  wherein if the first participant object is associated more positive priority value responses than negative priority value responses, a positive label is assigned to the first participant object, otherwise a negative label is assigned to the first participant object;
  a computation of a negative submatrix from at least a fourth portion of priority values from the ratings matrix, the at least fourth portion associated to a participant object labeled as zero and to a thought object of the plurality of thought objects with a negative label;
  an analysis of one or more priority value responses associated to a first participant object from the negative submatrix;
  a comparison of the number of positive priority value responses to the number of negative priority value responses associated to the first participant object;
  wherein if the first participant object is associated to more negative priority value responses than positive priority value responses, a negative label is assigned to the first participant object, otherwise a positive label assigning to the first participant object;
  wherein the matrix calculator is operable to iteratively compute, analyze and compare each participant object associated to the positive submatrix;
  wherein the matrix calculator is operable to iteratively compute, analyze and compare each participant object associated to the negative submatrix.

7. The system of claim 6, wherein the comparison of the number of positive priority value responses to the number of negative priority value responses is based on a ratio.

8. The system of claim 7, wherein the matrix calculator is further operable to compare a temporary label associated to a common participant object;
  wherein the common participant object is present in both the positive submatrix to the negative submatrix;
  wherein if the temporary label associated to the common participant object in the positive submatrix is the same as the temporary label associated to the common participant object in the negative submatrix, assign the matched temporary label to the label of the common participant object.

9. A method for clustering thought objects and participant objects based on interest for a plurality of objects executed by a network-connected processor according to a plurality of programmable instructions, the method comprising:
  receiving, at a device interface, a plurality of connections from a plurality of user devices on a network;
  associating, by a project controller, each user device to a participant object of a plurality of participant objects;
  receiving, at the project controller, one or more question objects comprising, at least, an arrangement of information from a first user device of the plurality of user devices, the project controller communicatively connected to the device interface;
  sending, by the project controller, the one or more question objects to at least a portion of the plurality of user devices;
  receiving, at the project controller, a plurality of thought objects from at least a portion of the user devices;
  sending, by the project controller, the plurality of the thought objects to at least a portion of the user devices;
  receiving, at the project controller, a plurality of priority value responses from a plurality of participant devices, each priority value response associated to a thought object of the plurality of thought objects and to a corresponding participant object of the plurality of participant objects;
  computing, at a matrix calculator, a ratings matrix, the ratings matrix based on the plurality of priority values, the ratings matrix comprised of at least a portion of the plurality of participant devices and at least a portion of the plurality of thought objects;
  permuting, by the matrix calculator, the ratings matrix into an interest-based submatrix, the permutation identifying a plurality of cohorts comprising at least a portion of the plurality of participant objects and at least a portion of the plurality of thought objects based on similar patterns of priority value responses;
  wherein the participant devices are comprised from at least a portion of the user devices;
  wherein each priority value falls within a predefined range;
  wherein the submatrix is computed using a strict association level comprising the steps of:
  (a) removing, by the matrix calculator, participant objects of the plurality of participant objects, that have no associated priority values;
  (b) removing, by the matrix calculator, thought objects of the plurality of thought objects, that have no associated priority values;
  (c) converting, by the matrix calculator, the plurality of priority values into a range centered around zero value;
  (d) calculating, by a score calculator, a polarization score for each thought object by summing the absolute values of the plurality of priority values assigned to an associated thought object and subtracting the absolute value of a sum of the plurality of priority values;
  (e) filtering, by the matrix calculator, at least a portion of the plurality of thought objects based on an associated polarization score;
  (f) calculating, by a score calculator, a passion score for each participant object of the plurality of participant objects by summing the absolute values of the plurality of priority values assigned by an associated participant object;
  (g) filtering, by the matrix calculator, at least a portion of the plurality of participant objects based on an associated passion score;

(h) assigning, by the matrix calculator, each participant object of the plurality of participant objects to its own cohort of a plurality of cohorts;

(i) selecting, by a pattern analyzer, a first cohort of the plurality of cohorts;

(j) iteratively comparing, by the pattern analyzer, a plurality of assigned priority value responses associated to the first cohort of the plurality of cohorts, to each plurality of assigned priority value responses associated to each remaining cohort of the plurality of cohorts, to determine an agreement;

(k) if there is agreement, merging the first cohort with the second cohort;

(l) selecting, by the pattern analyzer, a next cohort;

(m) repeating steps (j), (k), and (l) for all cohorts;

wherein the agreement between the first priority value response and the second priority value response is determined by comparing, by the pattern analyzer, signs associated to the first plurality of assigned priority value responses and signs associated to the second plurality of assigned priority value responses;

wherein the predefined range is a zero-centered scale;

if two cohorts remain:

(n) assigning, by matrix calculator, a binarized label to each participant object and to each thought object based on associated priority values;

otherwise:

(o) calculating, by the score calculator, a passion score for at least a portion of the remaining cohorts;

if the lowest of the passion scores associated to the remaining cohorts is less than a predefined threshold:

(p) removing, by the pattern analyzer, at least a portion of participant objects, the at least portion of participant objects associated to one or more remaining cohorts with the lowest passion score;

(q) returning to step (d);

otherwise:

(r) calculating, by the score calculator, a polarization score for the at least portion of the remaining thought objects;

(s) removing, by the matrix calculator, at least a portion of the plurality of thought objects, the at least portion of the plurality of thought objects associated to one or more thought objects with the lowest polarization score;

(t) returning to step (d).

10. The method of claim 9, further comprising the steps of:

(u) if it is determined, by the pattern analyzer, that at least one additional thought object, of the plurality of thought objects, should be labeled, labeling the at least one thought object;

(v) if it is determined, by the pattern analyzer, that at least one additional participant object, of the plurality of participant objects, should be labeled, labeling the at least one participant object;

(w) if it is determined, by the pattern analyzer, that at least one thought object with a non-zero label, of the plurality of thought objects should be removed, removing the at least one thought object by assigning a zero label;

(x) if it is determined, by the pattern analyzer, that at least one participant object with a non-zero label, of the plurality of participant objects, should be removed, removing the at least one participant object by assigning a zero label;

(y) if at least one thought object or at least one participant object is labeled or removed in steps (u), (v), (w), or (x), repeating steps (u), (v), (w), and (x);

wherein steps (u), (v), (w), and (x) are performed in any order;

wherein the determination to remove the at least one additional thought object is based on a comparison of patterns of priority values assigned to the at least one thought object by one or more participant objects of the plurality of participant objects, indicating an incompatibility between the label of the at least one thought object, the labels of the one or more participant objects, and the signs of the priority values assigned to the at least one thought object by the one or more participant objects;

wherein the determination to remove the at least one additional participant object is based on a comparison of patterns of priority values assigned by the at least one participant object to one or more thought objects of the plurality of thought objects, indicating an incompatibility between the label of the at least one participant object, the labels of the one or more thought objects of the plurality of thought objects, and the signs of the priority values assigned by the at least one participant object to one or more thought objects of the plurality of thought objects.

11. The method of claim 10, wherein labeling the at least one thought object comprises the steps of:

computing, by the matrix calculator, a positive submatrix from at least a first portion of the plurality of priority values from the ratings matrix, the at least first portion of priority values associated to a participant object with a positive label and to a thought object of the plurality of thought objects labeled as zero;

analyzing, by the matrix calculator, one or more priority value responses associated to a first thought object from the positive submatrix;

comparing, by the matrix calculator, the number of positive priority value responses to the number of negative priority value responses associated to the first thought object;

if the first thought object is associated to more positive priority value responses than negative priority value responses, associating, by the matrix calculator, a positive label to the first thought object;

otherwise associating, by the matrix calculator, a negative label to the first thought object;

repeating the previous four steps for each thought object associated to the positive submatrix;

computing, by the matrix calculator, a negative submatrix from at least a second portion of priority values from the ratings matrix, the at least second portion of priority values associated to a participant object with a negative label and to a thought object of the plurality of thought objects labeled as zero;

analyzing, by the matrix calculator, one or more priority value responses associated to a first thought object from the negative submatrix;

comparing, by the matrix calculator, the number of positive priority value responses to the number of negative priority value responses associated to the first thought object;

if the first thought object is associated to more negative priority value responses than positive priority value responses, associating, by the matrix calculator, a negative label to the first thought object;

otherwise associating, by the matrix calculator, a positive label to the first thought object;

repeating the previous four steps for each thought object associated to the negative submatrix.

12. The method of claim 11, wherein the comparison of the number of positive priority value responses to the number of negative priority value responses is based on a ratio.

13. The method of claim 12, wherein the matrix calculator is further operable to compare a temporary label associated to a common thought object;

wherein the common thought object is present in both the positive submatrix to the negative submatrix;

wherein if the temporary label associated to the common thought object in the positive submatrix is in agreement with the temporary label associated to the common participant object in the negative submatrix, assigning the matched temporary label to the label of the common thought object.

14. The method of claim 10, wherein labeling the at least one participant object comprises the steps of:

computing, by the matrix calculator, a positive submatrix from at least a third portion of priority values from the ratings matrix, the at least third portion associated to a participant object labeled as zero and to a thought object of the plurality of thought objects with a positive label;

analyzing, by the matrix calculator, one or more priority value responses associated to a first participant object from the positive submatrix;

comparing, by the matrix calculator, the number of positive priority value responses to the number of negative priority value responses associated to the first participant object;

if the first participant object is associated to more positive priority value responses than negative priority value responses, associating, by the matrix calculator, a positive label to the first participant object;

otherwise associating, by the matrix calculator, a negative label to the first participant object;

repeating the previous four steps for each participant object associated to the positive submatrix;

computing, by the matrix calculator, a negative submatrix from at least a fourth portion of priority values from the ratings matrix, the at least fourth portion associated to a participant object labeled as zero and to a thought object of the plurality of thought objects with a negative label;

analyzing, by the matrix calculator, one or more priority value responses associated to a first participant object from the negative submatrix;

comparing, by the matrix calculator, the number of positive priority value responses to the number of negative priority value responses associated to the first participant object;

if the first participant object is associated to more negative priority value responses than positive priority value responses, associating, by the matrix calculator, a negative label to the first participant object;

otherwise associating, by the matrix calculator, a positive label to the first participant object;

repeating the previous four steps for each participant object associated to the negative submatrix.

15. The method of claim 14, wherein the comparison of the number of positive priority value responses to the number of negative priority value responses is based on a ratio.

16. The method of claim 15, wherein the matrix calculator is further operable to compare a temporary label associated to a common participant object;

wherein the common participant object is present in both the positive submatrix to the negative submatrix;

wherein if the temporary label associated to the common participant object in the positive submatrix is not in disagreement with the temporary label associated to the common participant object in the negative submatrix, assigning the matched temporary label to the label of the common participant object.

* * * * *